(12) United States Patent
Uy et al.

(10) Patent No.: US 12,047,506 B2
(45) Date of Patent: Jul. 23, 2024

(54) SYSTEMS AND METHODS FOR USER-BASED AUTHENTICATION

(71) Applicant: Verizon Patent and Licensing Inc., Basking Ridge, NJ (US)

(72) Inventors: Warren Hojilla Uy, Randolph, NJ (US); Manuel Enrique Caceres, Basking Ridge, NJ (US); Bruno Mendez, Springfield, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 282 days.

(21) Appl. No.: 17/305,072

(22) Filed: Jun. 30, 2021

(65) Prior Publication Data

US 2021/0328797 A1 Oct. 21, 2021

Related U.S. Application Data

(63) Continuation of application No. 16/453,807, filed on Jun. 26, 2019, now Pat. No. 11,070,376.

(51) Int. Cl.
*H04L 9/32* (2006.01)
*H04L 9/30* (2006.01)

(52) U.S. Cl.
CPC ............. *H04L 9/3213* (2013.01); *H04L 9/30* (2013.01); *H04L 9/3231* (2013.01); *H04L 9/3234* (2013.01)

(58) Field of Classification Search
CPC ....... H04L 9/3213; H04L 9/30; H04L 9/3231; H04L 9/3234

USPC ......................................................... 726/10
See application file for complete search history.

(56) References Cited

U.S. PATENT DOCUMENTS

| 8,171,536 | B2 | 5/2012 | Wagner et al. |
| 10,069,824 | B2* | 9/2018 | Dascola ............. H04L 63/0861 |
| 10,341,310 | B1* | 7/2019 | Leon .................... H04L 9/3226 |
| 10,554,657 | B1 | 2/2020 | Siddiqui et al. |
| 10,924,921 | B2 | 2/2021 | Jin et al. |
| 2004/0187018 | A1* | 9/2004 | Owen ..................... H04L 9/321 |
| | | | 713/184 |
| 2006/0095771 | A1* | 5/2006 | Appenzeller ........ H04L 9/3247 |
| | | | 713/171 |
| 2008/0095360 | A1* | 4/2008 | Vuillaume ........... H04L 9/3236 |
| | | | 713/180 |
| 2008/0295162 | A1 | 11/2008 | Wagner et al. |
| 2013/0042111 | A1* | 2/2013 | Fiske ..................... G06F 21/32 |
| | | | 713/170 |

(Continued)

*Primary Examiner* — Teshome Hailu

(57) ABSTRACT

A device that includes a secure element or a secure environment receives a token for authenticating a user that has an account with a service provider. The device generates, based on the token, a set of keys that include at least a private key and a public key. The device performs a key authentication procedure to compare the set of keys and a configured set of keys and selects a public key, of the set of keys or the configured set of keys, based on a result of the key authentication procedure. The device causes a device identifier of the device and the public key to be provided to another device that uses the device identifier and the public key to perform an authentication procedure to authenticate the user. The device receives, from the other device, an indication of whether the device is connected to a network.

20 Claims, 12 Drawing Sheets

(56) References Cited

U.S. PATENT DOCUMENTS

| | | | |
|---|---|---|---|
| 2013/0111609 A1* | 5/2013 | Resch | H04L 1/0057 |
| | | | 726/29 |
| 2013/0179618 A1 | 7/2013 | Casas et al. | |
| 2016/0021537 A1* | 1/2016 | Dennis | H04W 12/08 |
| | | | 726/4 |
| 2016/0294555 A1* | 10/2016 | Jakobsson | H04L 9/0836 |
| 2018/0302223 A1 | 10/2018 | Benson et al. | |
| 2020/0107165 A1 | 4/2020 | Pai et al. | |

* cited by examiner

SYSTEMS AND METHODS FOR USER-BASED AUTHENTICATION

RELATED APPLICATION

This application is a continuation of U.S. patent application Ser. No. 16/453,807, entitled "SYSTEMS AND METHODS FOR USER-BASED AUTHENTICATION," filed Jun. 26, 2019, which is incorporated herein by reference in its entirety.

BACKGROUND

A user may have an account with a service provider (e.g., a telecommunication provider) and the user may associate multiple devices with the account. For example, two or more devices may be linked to the account, such as by sharing the same telephone number. This may allow the user to receive calls concurrently on the two or more devices.

DETAILED DESCRIPTION OF PREFERRED EMBODIMENTS

Figure 1A:
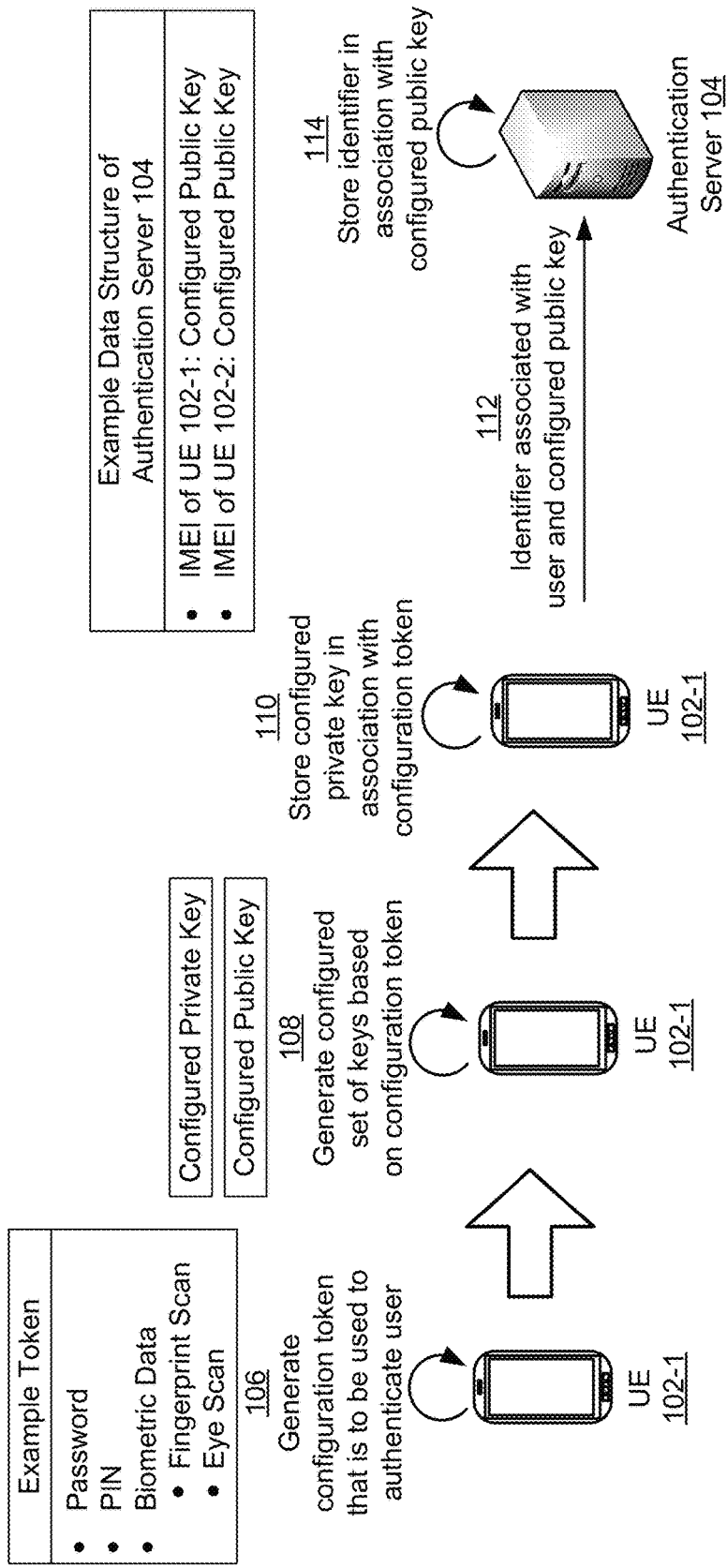
FIGS. 1A-1D are diagrams of one or more example implementations described herein.

The following detailed description of example implementations refers to the accompanying drawings. The same reference numbers in different drawings may identify the same or similar elements.

A user may have an account with a service provider. In some cases, the user may associate multiple devices with the account. For example, two or more devices may be linked to the account in a manner that allows the two or more devices to share the same telephone number.

However, allowing two or more devices to share the same telephone number may cause security and/or privacy issues for the user. For example, if the user leaves a first device (e.g., a mobile phone) in a public space, an unauthorized user may find the first device and may remove a subscriber identity module (SIM) card (e.g., a physical SIM card, a SIM card that can be remotely provisioned, such as an embedded SIM (eSIM), and/or the like) from the first device. This may allow the unauthorized user to place the SIM card into a second device (e.g., a device operated by the unauthorized user), such that the second device may now share a telephone number that is used for the first device. Additionally, the unauthorized user may then place the SIM card back into the first device to avoid detection. In this case, the unauthorized user may use the second device to receive calls and/or notifications that are intended for the user. This wastes resources of the second device and/or resources of one or more network devices by supporting unauthorized access to a service, causes an invasion of the user's privacy, causes a breach of security by making the unauthorized user privy to information that may be used for other unscrupulous activities such as identity theft, and/or the like.

Some implementations described herein provide a method to determine whether to permit a user equipment (UE) to access a shared service (e.g., a telephone number that is shared by two or more UEs and/or another type of service) by using a secure element of the UE to authenticate a user who is attempting to access the shared service. The secure element may be linked to an account that the user has with a service provider. In this case, the user may provide a token that may be received by the secure element of the UE (e.g., by inputting a password, providing a fingerprint, and/or the like). The secure element may include or have access to a data structure that associates a configuration token with a configured set of keys (e.g., a configured private key and a configured public key). Additionally, the UE (e.g., using the secure element) may generate, based on the received token, a set of keys that include a private key and a public key.

Furthermore, the UE may perform a key authentication procedure to compare the set of keys and the configured set of keys (or to compare the public key and the configured public key). In this case, the UE may select a particular public key to provide to an authentication server based on a result of the key authentication procedure (e.g., by selecting the configured public key or the public key that was generated based on the token). Additionally, the UE may provide a device identifier and a selected public key to the authentication server to cause the authentication server to perform an authentication procedure to determine whether to authenticate the user. If a correct token was provided by the user and was used to generate the set of keys, the user may be authenticated, and the UE may be given access to the shared service.

However, if an incorrect token was used to generate the set of keys, the user may not be authenticated, and the UE may be prevented from accessing the shared service. For example, if the user is an unauthorized user and has configured a second UE (e.g., a device operated by the unauthorized user) with a subscriber identity module (SIM) card of the UE (e.g., which includes the secure element), and the second UE is compatible with the secure element, the unauthorized user may provide a particular token that does not match the configuration token (e.g., a password input by the unauthorized user does not match a configured password of the user). This may cause the second UE to generate a particular set of keys based on the particular token, and to select, based on a result of the key authentication procedure, a specific public key to provide to the authentication server. Because the particular token did not match the configuration token, the particular set of keys that were generated based on the particular token will cause the authentication procedure (performed by the authentication server) to fail, thereby preventing the unauthorized user from obtaining access to the shared service.

In this way, a particular UE that is configured with the secure element (e.g., the UE, the second UE, and/or the like) improves security and privacy for the user, ensures that only authorized users are able to access the shared service, and/or the like. For example, the particular UE improves security by preventing the unauthorized user from gaining unauthorized access to the shared service. Additionally, the particular UE improves privacy of the user by preventing the unauthorized user from being privy to confidential information (e.g., which may be an invasion of the user's privacy and/or may be used for theft and related crimes). Furthermore, the particular UE conserves resources (e.g., processing resources, network resources, and/or the like) that would otherwise be wasted on unauthorized use of the shared service, conserves resources relative to an inferior solution that inefficiently and/or ineffectively prevents against unauthorized access to the shared service, and/or the like.

FIGS. 1A-1D are diagrams of one or more example implementations 100 described herein. Example implementation(s) 100 may include one or more user equipments (UEs) (shown as UE 102-1, UE 102-2, and UE 102-3) and an authentication server 104.

Figure 1B:
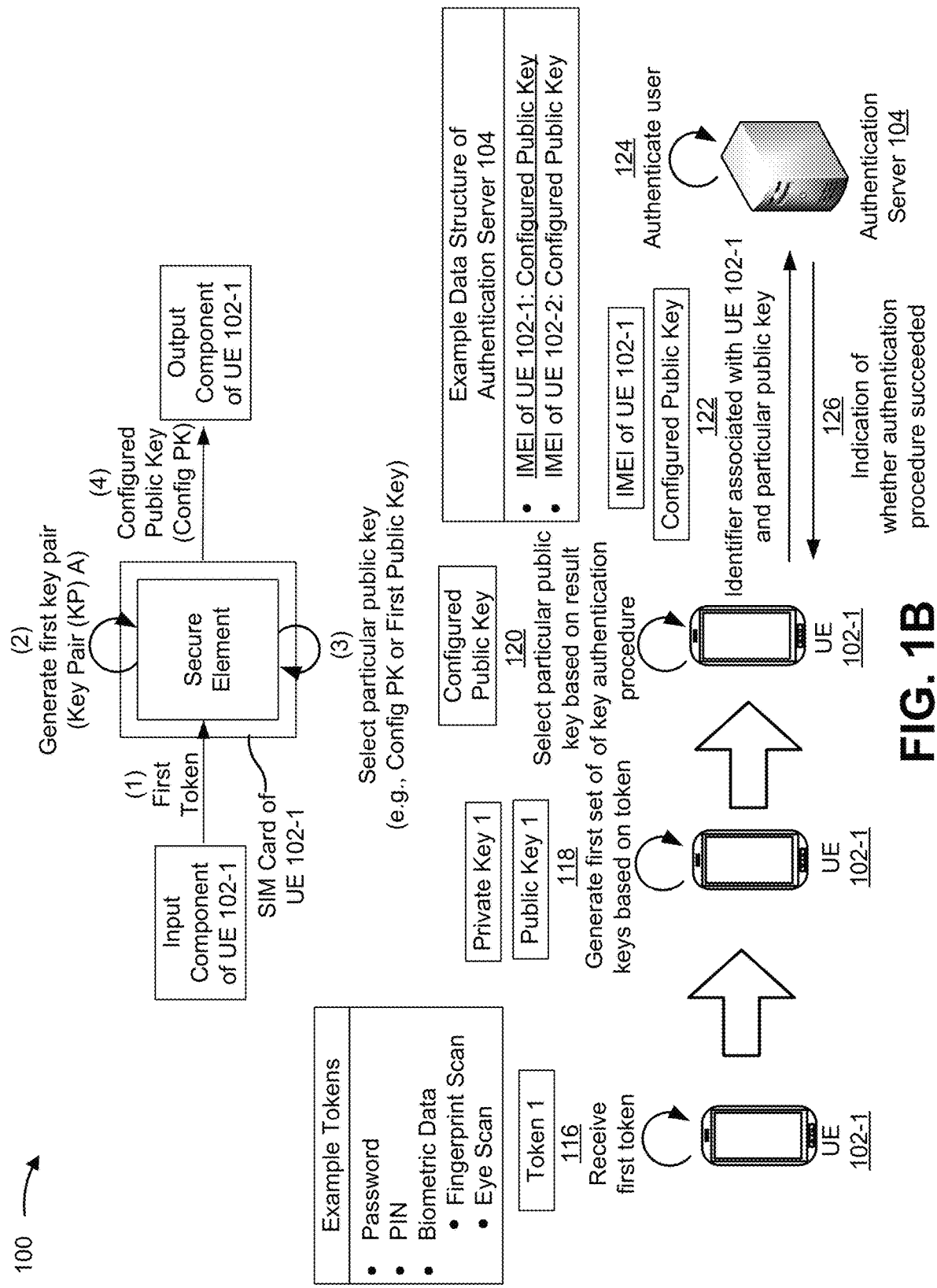
Figure 1C:
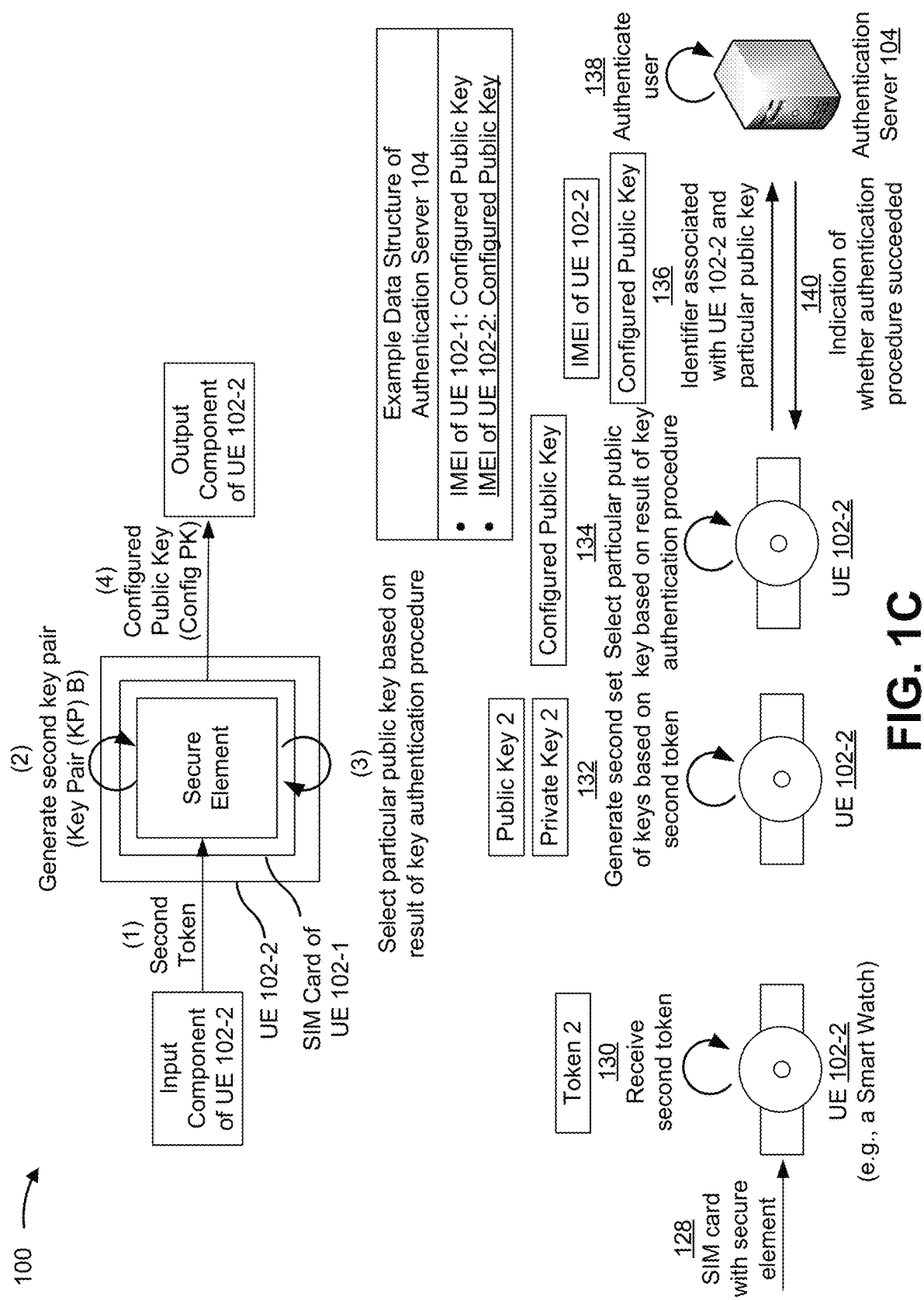
Figure 1D:
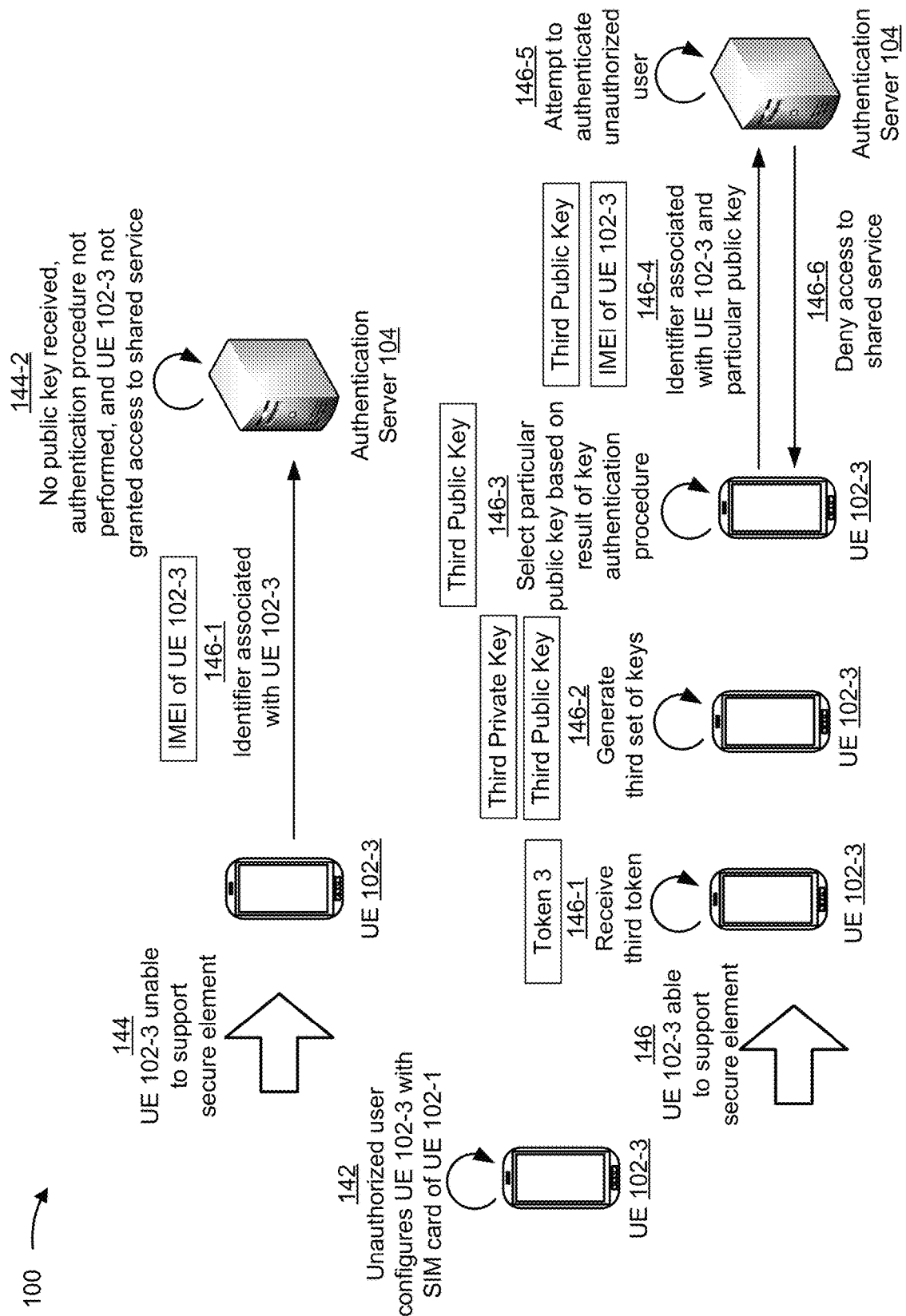

As shown in FIGS. 1A-1D, a UE (e.g., UE 102-1, UE 102-2, and/or UE 102-3) may use a secure element to authenticate a particular user (e.g., an authorized user, an unauthorized user, and/or the like) who is attempting to use the UE to access a shared service (e.g., to share a telephone number with another UE). As shown in FIG. 1A, a user (e.g., the authorized user) may register for an authentication service that allows multiple UEs to access the shared service, where the multiple UEs are linked to an account that the user has with a service provider. As shown in FIG. 1B, UE 102-1 may use a secure element (defined further herein) to authenticate the user. As shown in FIG. 1C, UE 102-2 may use the secure element to authenticate the user. As shown in FIG. 1D, UE 102-3 may attempt to use the secure element to authenticate an unauthorized user.

As shown in FIG. 1A, the user may register for the authentication service that is capable of being used to authenticate the user (e.g., such that a particular UE being accessed by the user is able to use the shared service). The shared service may include a service to share a telephone number between multiple UEs, a service to share another type of identifier between multiple UEs, and/or another type of service.

In some implementations, UE 102-1 (and/or other UEs that are linked to the account of the user) may be configured with a subscriber identity module (SIM) card that includes a secure element. For example, UE 102-1 (and/or the other UEs that are linked to the account of the user) may be configured with a SIM card that includes a secure element that may assist in authenticating the user.

The SIM card may be a physical SIM card, an eSIM card, a virtual SIM card, and/or the like. The physical SIM card and/or the eSIM card may be configured to UE 102-1 by being physically installed onto UE 102-1. The virtual SIM card may be configured to UE 102-1 by installing a virtual SIM card application. The secure element may be capable of securely hosting an operating system, an application, and/or securely storing information that may be used to authenticate the user. In some cases, the secure element may be configured with a secure storage applet that includes one or more encryption functions and/or authentication functions that assist in secure authentication of the user (as described in detail further herein). In some implementations, one or more UEs linked to the account of the user may be configured with a secure environment (e.g., instead of the secure element, in addition to the secure element, and/or the like). Additional information regarding the secure environment is provided in FIGS. 2A-2E.

As shown by reference number 106, UE 102-1 may generate a configuration token that is to be used to authenticate the user. For example, UE 102-1 may generate a configuration token that may be used to authenticate subsequent attempts of the user to use UE 102-1 (and/or another UE that is using the secure element of UE 102-1) to access the shared service. In this case, the user may use UE 102-1 to access a user authentication application (e.g., a mobile application, a web application, and/or the like) that includes the authentication service that may be used to authenticate users. Additionally, the interface of the user authentication application may prompt the user to perform one or more actions that cause UE 102-1 to generate and/or store the configuration token. The configuration token may include one or more values that represent a password (e.g., a combination of characters, a pattern of hand motions made across an interface of the first UE, and/or the like), a personal identification number (PIN), biometric data of the user (e.g., that may be used for a fingerprint scan, an eye scan, and/or the like), and/or the like.

As an example, UE 102-1 may generate a password and/or a PIN. For example, the user may interact with a display screen of UE 102-1 to create a password and/or a PIN. Additionally, or alternatively, and provided as another example, the user may interact with UE 102-1 to cause UE 102-1 to generate biometric data of the user, such as an eye scan, a fingerprint scan, and/or the like. To provide a few specific examples, the user may allow UE 102-1 to capture video data and/or image data depicting one or more eyes of the user (e.g., as part of an eye scan), parts of one or more fingers of the user (e.g., as part of a fingerprint scan), and/or the like. In these examples, UE 102-1 may use the video data and/or the image data as biometric data of the user, may generate biometric data of the user based on the video data and/or the image data, and/or the like.

In some implementations, UE 102-1 may be configured with one or more authentication rules. For example, the secure element of UE 102-1 may be configured with one or more authentication rules that cause UE 102-1 to execute the authentication service. The authentication service, when executed, may cause UE 102-1 to prompt the user to provide a token, may cause UE 102-1 to automatically capture a token, and/or the like. The one or more authentication rules may include an authentication rule that indicates to execute the authentication service when UE 102-1 boots up, an authentication rule that indicates to execute the authentication service when a state of UE 102-1 changes (e.g., when UE 102-1 wakes up from sleep mode), an authentication rule that indicates to execute the authentication service when a specific application is launched, and/or the like.

In some implementations, UE 102-1 may store the configuration token. For example, UE 102-1 may store the configuration token using a data structure associated with (e.g., supported by) the secure element. By storing the configuration token using the data structure associated with the secure element, the configuration token may be referenced and compared to subsequent tokens input by the user or other users who attempt to use UE 102-1 (and/or another UE that is configured with the secure element) to access the shared service, as will be described further herein.

As shown by reference number 108, UE 102-1 may generate a configured set of keys based on the configuration token. For example, UE 102-1 (e.g., using the secure element) may use one or more encryption functions to process the configuration token to generate the configured set of keys.

The one or more encryption functions may include an asymmetric encryption function (e.g., a Rivest-Shamir-Adleman (RSA) encryption function, a function using a digital signature algorithm (DSA), and/or the like), a symmetric encryption function (e.g., an advanced encryption standard (AES) function, a data encryption standard (DES) function, and/or the like), and/or the like. The configured set of keys may include at least a configured private key and a configured public key (e.g., in some cases, the configured set of keys may include multiple configured public keys). In some implementations, the private key may be stored via the data structure associated with the secure element.

By generating the configured set of keys based on the configuration token, the secure element is configured in a manner that prevents successful authentication unless a subsequently received token matches the configuration token. For example, if, during a subsequent attempt by the user (or an unauthorized user) to use UE 102-1 to access the shared service, the user (or the unauthorized user) were to provide an incorrect token, then UE 102-1 may generate a particular set of keys based on the incorrect token. In this case, the particular set of keys would be unable to be used to authenticate the user (or the unauthorized user), as will be shown in further detail in FIG. 1D.

As shown by reference number 110, UE 102-1 may store a configured private key, of the configured set of keys, in association with the configuration token. For example, UE 102-1 may store the configured private key in association with the configuration token using the data structure associated with the secure element. In some cases, UE 102-1 may store the configured set of keys in association with the configuration token (e.g., both the configured private key and the configured public key).

As shown by reference number 112, UE 102-1 may provide, to authentication server 104, an identifier associated with UE 102-1 and the configured public key. For example, UE 102-1 may use an application programming interface (API) and/or another type of communication interface to provide authentication server 104 with the identifier associated with UE 102-1 and the configured public key. The identifier may uniquely identify UE 102-1, the user, and/or the account of the user, and may include an international mobile subscriber identity (IMSI) number, an international mobile equipment identity (IMEI) number, a mobile station international subscriber directory number (MSISDN), a permanent equipment identifier (PEI), and/or a similar type of identifier.

As shown by reference number 114, authentication server 104 may store the identifier in association with the configured public key. For example, authentication server 104 may store the identifier in association with the configured public key using a data structure associated with the account of the user. In some implementations, authentication server 104 may include a home subscriber server (HSS) that is part of a fourth generation (4G) network, such as a 4G long-term evolution (LTE) network, a unified data management (UDM) server that is part of a fifth generation (5G) network, and/or the like. In this case, the association between the identifier and the configured public key may be stored in association with subscriber profile data, in association with an account identifier for the account of the user, and/or the like.

In some implementations, authentication server 104 may associate the configured public key with one or more other identifiers. For example, authentication server 104 may associate the configured public key with one or more other identifiers instead of associating the configured public key with the identifier received from UE 102-1, in addition to associating the configured public key with the identifier received from UE 102-1, and/or the like. As an example, UE 102-1 may provide, to authentication server 104, an IMEI number of UE 102-1 and the configured public key. In this case, authentication server 104 may use the IMEI number to identify the account of the user (e.g., the subscriber profile), and may update the data structure associated with the account in a manner that associates the configured public key with the IMEI number of UE 102-1, with the one or more other identifiers (e.g., an IMSI of UE 102-1, an MSISDN of UE 102-1, and/or the like), and/or the like.

Additionally, or alternatively, authentication server 104 may include an over the air (OTA) platform. For example, authentication server 104 may be associated with a third party cloud provider (e.g., rather than a telecommunication provider) and may associate the identifier and the configured public key using secure data storage. In this case, authentication server 104 may provide secure data storage, regardless of a channel used to transmit the identifier and the configured public key (e.g., a short message service (SMS) channel, a hypertext transfer protocol secure (HTTPS) channel, and/or the like), regardless of a type of network technology used, and/or the like.

In some implementations, the user may register one or more other UEs (e.g., UE 102-2) for the authentication service. For example, the user may interact with an interface of the user authentication application (e.g., that provides the authentication service) to input a list of one or more identifiers for the one or more other UEs that the user would like to register for the authentication service. In this case, the list may be provided to authentication server 104 and stored in association with the identifier associated with UE 102-1 and the configured public key. In some cases, when the user registers UE 102-1, a complete list of identifiers for one or more other UEs that are linked to the account of the user may be automatically stored in association with the identifier associated with UE 102-1 and the configured public key. For example, the user profile data for the account of the user may already store a list of identifiers for one or more UEs that are linked to the account. In this case, authentication server 104 may automatically associate the list of identifiers with the identifier associated with UE 102-1 and the configured public key (e.g., based on the user completing a registration process, based on the user requesting that all UEs linked to the account be registered, and/or the like).

In this way, the user registers for the authentication service, such that UEs linked to the account of the user (e.g., UE 102-1, UE 102-2) may undergo an authentication procedure before being permitted to access the shared service.

As shown in FIG. 1B, UE 102-1 may assist authentication server 104 in authenticating the user. For example, and as shown by reference number 116, UE 102-1 may receive a first token (shown as Token 1). In this case, the user may interact with UE 102-1 to input the first token, to cause UE 102-1 to capture the first token, and/or the like. As an example, the user may interact with a display screen of UE 102-1 to input, as the first token, a password, a PIN, and/or the like. In this example, the first token may be provided from an input component of UE 102-1 to the secure element.

Additionally, or alternatively, and provided as another example, UE 102-1 may capture biometric data of the user (e.g., biometric data identifying one or more eyes of the user, biometric data identifying one or more fingerprints of the user, and/or the like). In this example, UE 102-1 may use a camera component, one or more sensors, and/or the like, to capture the biometric data of the user.

As shown by reference number 118, UE 102-1 may generate a first set of keys based on the first token. For example, UE 102-1 (e.g., using the secure element) may generate a first set of keys in a manner described in connection with FIG. 1A (e.g., by using one or more encryption functions of the secure storage applet to process the first token). The first set of keys may include at least a first private key and a first public key (e.g., in some cases, the first set of keys may include multiple public keys). In some implementations, UE 102-1 may delete the first private key (e.g., because the first private key may be a duplicate of the configured private key, which is already stored via the data structure associated with the secure element). Additionally, or alternatively, the one or more public keys may be securely provided over a network to authenticate the user, as will be described further herein.

In the example shown, UE 102-1 may generate a first key pair (shown as Key Pair A) based on the first token. In this example, UE 102-1 may use the one or more encryption functions to process the first token to generate a first key pair that includes a first private key (shown as Private Key 1) and a first public key (shown as Public Key 1).

As shown by reference number 120, UE 102-1 may select a particular public key for transmission to authentication server 104 based on a result of a key authentication procedure. For example, UE 102-1 may select the configured public key, or the first public key, based on a result of a key authentication procedure. To perform the key authentication procedure, UE 102-1 (e.g., using the secure element) may reference the data structure associated with the secure element to compare the first set of keys with the configured set of keys. In some cases, UE 102-1 may reference the data structure to compare the first public key and the configured public key (e.g., without comparing a first private key and the configured private key).

If the configured set of keys match the first set of keys (or if the configured public key matches the first public key), UE 102-1 may select the configured public key as the particular public key that is to be provided to authentication server 104. If the configured set of keys do not match the first set of keys (or if the configured public key does not match the first public key), UE 102-1 may select the first public key as the particular public key that is to be provided to authentication server 104. In the example shown, UE 102-1 may select the configured public key based on the configured public key matching the first public key.

In some implementations, UE 102-1 may determine whether to perform a first one or more actions or a second one or more actions based on whether contents of the data structure include the configured set of keys (or at least the configured public key). In some cases, such as the first time that UE 102-1 generates the configured set of keys, UE 102-1 may perform the first one or more actions by storing the particular set of keys in association with the configuration token (e.g., as shown in FIG. 1A). In other cases, such as when UE 102-1 generates a new set of keys that is not the configured set of keys (e.g., the first set of keys), UE 102-1 may perform the second one or more actions by selecting the particular public key based on a result of the key authentication procedure. Therefore, UE 102-1 may determine to perform the first one or more actions or the second one or more actions by determining whether the contents of the data structure include the configured set of keys.

As shown by reference number 122, UE 102-1 may provide, to authentication server 104, the identifier associated with UE 102-1 and the particular public key. For example, UE 102-1 may use the API and/or the other type of communication interface (described above) to provide authentication server 104 with the identifier associated with UE 102-1 and the particular public key. In the example shown, UE 102-1 may provide authentication server 104 with an IMEI number for UE 102-1 and the configured public key (shown as Configured Public Key).

As shown by reference number 124, authentication server 104 may authenticate the user. For example, authentication server 104 may perform an authentication procedure to authenticate the user. The authentication procedure may include verifying whether the identifier received is associated with a UE that is registered for the authentication service, verifying whether the particular public key matches the configured public key stored via the data structure associated with the account of the user, and/or the like.

As an example, authentication server 104 may use the identifier associated with UE 102-1 to identify the data structure associated with the account of the user. In this example, authentication server 104 may reference the data structure to verify that UE 102-1 is registered for the authentication service, may verify whether the particular public key matches the configured public key, and/or the like. In the example shown, authentication server 104 may successfully authenticate the user based on verifying that UE 102-1 is registered for the authentication service and/or based on verifying that the particular public key matches the configured public key stored via the data structure.

As shown by reference number 126, authentication server 104 may provide, to UE 102-1, an indication of whether the authentication procedure succeeded. For example, authentication server 104 may use the API and/or other communication interface described above to provide UE 102-1 with the indication of whether the authentication procedure succeeded.

In some implementations, if the authentication procedure was successful, authentication server 104 may cause full access of the shared service to be provided to UE 102-1. In some implementations, if the authentication procedure did not succeed, authentication server 104 may prevent UE 102-1 from accessing the shared service, may cause limited access to be provided to the shared service (e.g., by limiting particular aspects of the shared service, by restricting network performance metrics relating to the shared service, and/or the like), and/or the like.

In this way, UE 102-1 assists authentication server 104 in authenticating the user to provide UE 102-1 with access to the shared service.

As shown in FIG. 1C, the user may be authenticated while attempting to use UE 102-2 to access the shared service. For example, and as shown by reference number 128, UE 102-2 (shown as a Smart Watch) may be configured with the SIM card of UE 102-1 (e.g., which includes the secure element).

If the SIM card is a physical SIM card, the physical SIM card may be placed into UE 102-2 (e.g., in place of another SIM card that had previously been configured to UE 102-2, in addition to the other SIM card, and/or the like). If the SIM card is a virtual SIM card, the virtual SIM card of UE 102-1 may be configured onto UE 102-2 using an over-the-air (OTA) configuration technique and/or a similar type of technique. The OTA configuration technique may allow the virtual SIM card of UE 102-1 to be installed onto UE 102-2, the secure element of UE 102-1 to be installed onto UE 102-2, the configured set of keys to be made available to UE 102-2 in a secure manner, and/or the like.

As shown by reference number 130, UE 102-2 may receive a second token. For example, the user may interact with UE 102-2 to input a second token (e.g., which may have the same value as the first token), to cause UE 102-2 to capture the second token, and/or the like. This may cause one or more processors of UE 102-2 to receive the second token (e.g., from an input component of UE 102-2), to generate the second token based on video data and/or image data received, and/or the like.

As shown by reference number 132, UE 102-2 may generate a second set of keys based on the second token. For example, UE 102-2 may generate a second set of keys based on the second token. In this case, UE 102-2 may generate the second set of keys in the same manner as described in connection with generating the first set of keys. In the example shown, UE 102-2 may generate a second private key (shown as Private Key 2) and a second public key (shown as Public Key 2).

As shown by reference number 134, UE 102-2 may select a particular public key for transmission to authentication server 104 based on a result of the authentication procedure. For example, UE 102-2 may perform the key authentication procedure by referencing the data structure associated with the secure element to compare the configured set of keys and the second set of keys (or to compare the configured public key and the second public key).

If the configured set of keys match the second set of keys (or if the configured public key matches the second public key), UE 102-1 may select the configured public key as the particular public key that is to be provided to authentication server 104. If the configured set of keys do not match the second set of keys (or if the configured public key does not match the second public key), UE 102-1 may select the second public key as the particular public key that is to be provided to authentication server 104. In the example shown, UE 102-2 may select the configured public key as the particular public key based on the configured set of keys matching the second set of keys (or based on the configured public key matching the second public key). A similar example involving an unauthorized user attempting to use UE 102-3 to gain access to the shared service is described in FIG. 1D.

As shown by reference number 136, UE 102-2 may provide, to authentication server 104, an identifier associated with UE 102-2 and the particular public key. For example, UE 102-2 may use the API or the other communication interface to provide authentication server 104 with the identifier associated with UE 102-2 and the particular public key. In the example shown, UE 102-2 may provide authentication server 104 with the particular public key (shown as the configured public key) and with an IMEI of UE 102-2.

As shown by reference number 138, authentication server 104 may authenticate the user. For example, authentication server 104 may perform the authentication procedure by using the identifier associated with UE 102-2 to identify the account of the user. In this case, authentication server 104 may reference the data structure associated with the account of the user to compare the particular public key received from UE 102-2 and the configured public key that is stored via the data structure. In the example shown, the authentication procedure succeeds because authentication server 104 determines that the configured public key received from UE 102-2 has a value that matches the configured public key stored via the data structure.

As shown by reference number 140, authentication server 104 may provide, to UE 102-2, an indication of whether the authentication procedure succeeded. In the example shown, because the authentication procedure succeeds, authentication server 104 may cause UE 102-2 to receive access to the shared service. If, for example, the shared service is a call sharing service, then UE 102-2 may be able to receive calls via a telephone number that might otherwise be used exclusively by UE 102-1.

In this way, UE 102-2 assists authentication server 104 in authenticating the user to provide UE 102-2 with access to the shared service.

As shown in FIG. 1D, an unauthorized user may be denied access to receiving calls and/or accessing other services linked to UE 102-1 and/or UE 102-2. For example, and as shown by reference number 142, the unauthorized user may configure UE 102-3 with the SIM card of UE 102-1. As a specific example, the user may accidentally leave UE 102-1 in a public place and UE 102-1 may be found by the unauthorized user, who may configure UE 102-3 with the SIM card of UE 102-1.

As shown by reference number 144, UE 102-3 may be unable to support the secure element included in the SIM card of UE 102-1. For example, and as shown by reference number 146-1, UE 102-3 may provide, to authentication server 104, an identifier associated with UE 102-3. In this case, without being able to support the secure element, UE 102-3 may not prompt the unauthorized user to provide a new token and may not generate a new set of keys. Consequently, UE 102-3 may only provide authentication server 104 with the identifier associated with UE 102-3. As shown by reference number 144-2, because no public key was received, authentication server 104 may not perform the authentication procedure, which may prevent UE 102-3 from being granted access to the shared service.

As shown by reference number 146, UE 102-3 may be able to support the secure element included in the SIM card of UE 102-1. For example, and as shown by reference number 146-1, UE 102-3 may receive a third token. In this case, because the unauthorized user does not have a correct token, the unauthorized user may provide, to UE 102-3 and as the third token, an incorrect password, an incorrect PIN, video data and/or image data that is not of the user, and/or the like. Consequently, the third token may not match the configuration token stored by the data structure associated with the secure element. In some cases, UE 102-3 may display an error message to indicate that an incorrect token was provided. In other cases, as shown below, UE 102-3 may continue to attempt to authenticate the unauthorized user.

As shown by reference number 146-2, UE 102-3 may generate a third set of keys. For example, UE 102-3 may generate a third set of keys based on the third token. As shown by reference number 146-3, UE 102-3 may select a particular public key based on a result of the key authentication procedure. For example, UE 102-3 may perform the key authentication procedure to compare the configured set of keys and the third set of keys (or to compare the configured public key and the third public key). In this case, because the third set of keys do not match the configured set of keys (or because the third public key does not match the configured public key), UE 102-3 may select the third public key (and not the configured public key), as the particular public key to provide to authentication server 104.

As shown by reference number 146-4, UE 102-3 may provide, to authentication server 104, an identifier associated with UE 102-3 and the third public key. As shown by reference number 146-5, authentication server 104 may attempt to authenticate the unauthorized user. For example, authentication server 104 may perform the authentication procedure to verify whether the identifier received is associated with a UE that is registered for the authentication service, to verify whether the particular public key matches the configured public key stored via the data structure associated with the account of the user, and/or the like. In this case, authentication server 104 may reference the data structure associated with the account of the user to compare the particular public key received from UE 102-2 and the configured public key that is stored via the data structure. In the example shown, the authentication procedure will not succeed because authentication server 104 may determine that the particular public key received from UE 102-2 does not match the configured public key. As shown by reference number 146-6, authentication server 104 may provide, to UE 102-3, an indication that access to the shared service has been denied.

In this way, a particular UE that is configured with the secure element (e.g., UE 102-1, UE 102-2, UE 102-3, and/or the like) improves security and privacy for the user, ensures that only authorized users are able to access the shared service, and/or the like.

As indicated above, FIGS. 1A-1D are provided as one or more examples. Other examples can differ from what is described with regard to FIGS. 1A-1D. For example, there may be additional devices and/or networks, fewer devices and/or networks, different devices and/or networks, or differently arranged devices and/or networks than those shown in FIGS. 1A-1D. Furthermore, two or more devices shown in FIGS. 1A-1D may be implemented within a single device, or a single device shown in FIGS. 1A-1D may be implemented as multiple and/or distributed devices. Additionally, or alternatively, a set of devices (e.g., one or more devices) included in the one or more example implementations 100 may perform one or more functions described as being performed by another set of devices included in the one or more example implementations 100.

FIGS. 2A-2E are diagrams of one or more example implementations 200 described herein. Example implementation(s) 200 may include one or more user equipment (UEs) (shown as UE 202-1, UE 202-2, and UE 202-3), an authentication server 204, and a billing server 206. In one or more implementations described herein, UE 202-1 and UE 202-2 may be devices that are linked to an account that a user has with a service provider, and UE 202-3 may be a device that is associated with an unauthorized user and that is not linked to the account of the user. As shown in FIGS. 2A-2E, a biometric authentication procedure may be implemented that allows the user to be authenticated while accessing a shared service via UE 202-1 and/or UE 202-2 and that prevents an unauthorized user from accessing the shared service via UE 202-3. Furthermore, in FIGS. 2A-2E, UE 202-1, UE 202-2, and/or UE 202-3 may be configured with a secure environment (shown as a Trust Execution Environment (TEE)) (e.g., rather than the secure element used in FIGS. 1A-1D).

Figure 2A:
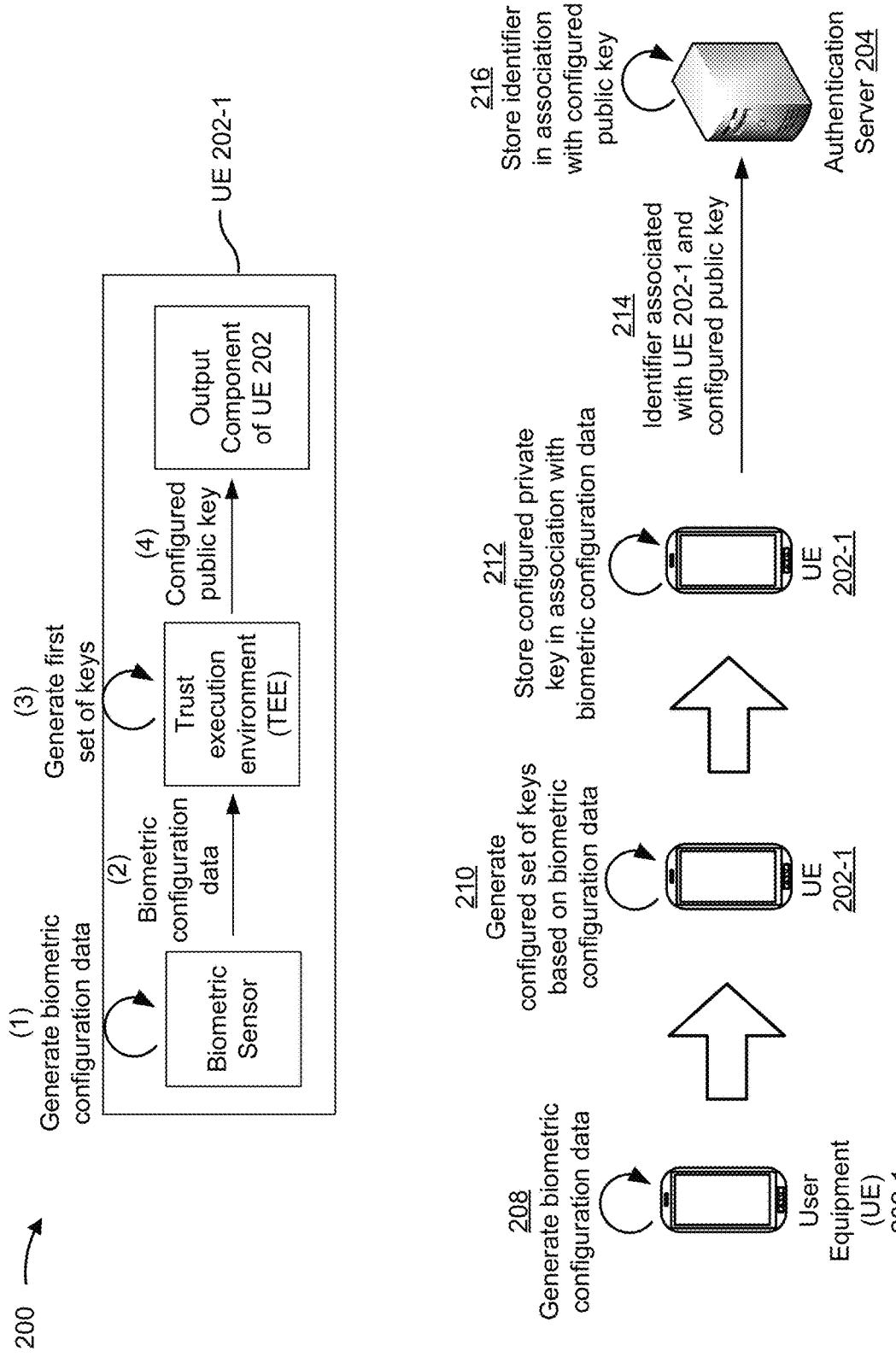
FIGS. 2A-2E are diagrams of one or more example implementations described herein.

As shown in FIG. 2A, the user may register for a biometric authentication service that is capable of being used to authenticate the user when the user accesses a particular UE that is linked to the account. In some implementations, a particular UE (e.g., UE 202-1, UE 202-2, UE 202-3, and/or the like) may be configured with a SIM card that includes a secure environment. For example, the particular UE may be configured with a subscriber identity module (SIM) card that includes a secure environment that may assist in authenticating the user.

The secure environment may include a trust execution environment (TEE) and/or a similar type of environment. The secure environment may be capable of receiving biometric data from one or more sensors of a UE (e.g., UE 202-1, UE 202-2, UE 202-3, and/or the like), and may support one or more biometric encryption functions (e.g., one or more biometric public key infrastructure (PKI) functions, and/or the like) that may be used to generate keys based on biometric data, one or more authentication functions may be used to assist in secure authentication of the user, and/or the like.

As shown by reference number 208, UE 202-1 may generate biometric configuration data that is to be used to authenticate the user. For example, UE 202-1 the user may interact with UE 202-1 to register for a biometric authentication service and may complete an initial biometric scan. The user may register for the biometric authentication service in a manner similar to that used to register for the authentication service described in FIG. 1A. The initial biometric scan may cause one or more sensors of UE 202-1 to capture biometric configuration data of the user, and may include an eye scan, a fingerprint scan, and/or the like. When the initial biometric scan is complete, the biometric configuration data captured by the one or more sensors may be provided to the secure environment of UE 202-1.

In some implementations, UE 202-1 may store the biometric configuration data. For example, UE 202-1 may store the biometric configuration data using a data structure associated with (e.g., supported by) the secure environment.

As shown by reference number 210, UE 202-1 may generate a configured set of keys based on biometric configuration data generated from the initial biometric scan. For example, UE 202-1 (e.g., using the secure environment) may generate a configured set of keys by using the one or more biometric encryption functions to process the biometric configuration data to generate the configured set of keys. The configured set of keys may include at least a configured private key and a configured public key. By generating the configured set of keys based on the biometric configuration data, the secure environment is configured in a manner that prevents successful authentication unless subsequently received biometric data matches the biometric configuration data of the user.

As shown by reference number 212, UE 202-1 may store the configured private key in association with the biometric configuration data of the user. For example, UE 202-1 may store the configured private key in association with the configuration token using the data structure associated with the secure environment.

As shown by reference number 214, UE 202-1 may provide, to authentication server 204, an identifier associated with UE 202-1 and the configured public key. As shown by reference number 216, authentication server 204 may store the identifier associated with UE 202-1 in association with the configured public key. The storage may be performed in a manner consistent with that described in FIG. 1A.

In this way, the user registers for the biometric authentication service, such that UEs linked to the account of the user (e.g., UE 102-1, UE 102-2) may undergo an authentication procedure before being permitted to access the shared service.

Figure 2B:
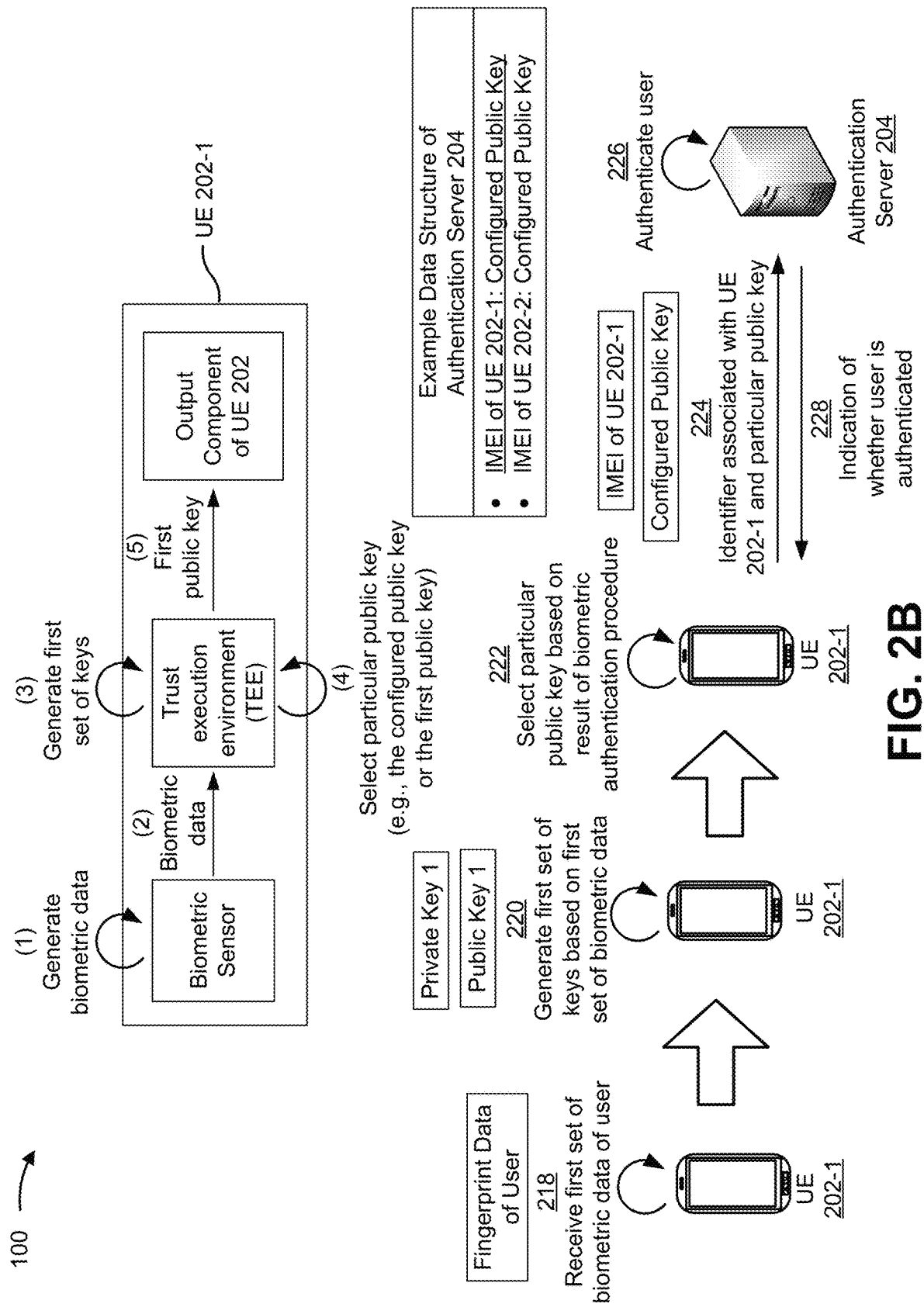

As shown in FIG. 2B, and by reference number 218, UE 202-1 may receive a first set of biometric data of the user. For example, the user may interact with an interface of UE 202-1 to cause UE 202-1 to capture a first set of biometric data. As shown by reference number 220, UE 202-1 may generate the first set of keys based on the first set of biometric data. For example, UE 202-1 (e.g., using the secure environment) may generate a first set of keys in a manner described elsewhere herein (e.g., by using one or more biometric encryption functions to process the first set of biometric data). The first set of keys may include at least a first private key and a first public key (e.g., in some cases, the first set of keys may include multiple public keys).

As shown by reference number 222, UE 202-1 may select a particular public key based on a result of a biometric authentication procedure. For example, UE 202-1 may select the configured public key, or the first public key, based on a result of a key authentication procedure. To perform the key authentication procedure, UE 202-1 (e.g., using the secure environment) may reference the data structure associated with the secure environment to compare the first set of keys with the configured set of keys (or to compare the configured public key and the first public key).

If the configured set of keys match the first set of keys (or if the configured public key matches the first public key), UE 202-1 may select the configured public key as the particular public key that is to be provided to authentication server 204. If the configured set of keys do not match the first set of keys (or if the configured public key does not match the first public key), UE 202-1 may select the first public key as the particular public key that is to be provided to authentication server 104. In the example shown, UE 202-1 may select the configured public key based on the configured public key matching the first public key.

As shown by reference number 224, UE 202-1 may provide, to authentication server 204, the identifier associated with UE 202-1 and the particular public key. As shown by reference number 226, authentication server 204 may authenticate the user. For example, authentication server 204 may perform an authentication procedure to authenticate the user. The authentication procedure may include verifying whether the identifier received is associated with a UE that is registered for the biometric authentication service, verifying whether the particular public key matches the configured public key stored via the data structure associated with the account of the user, and/or the like.

As shown by reference number 228, authentication server 204 may provide, to UE 202-1, an indication of whether the user has been authenticated. In some implementations, if the authentication procedure was successful, authentication server 204 may cause full access of the shared service to be provided to UE 202-1. In some implementations, if the authentication procedure did not succeed, authentication server 204 may prevent UE 202-1 from accessing the shared service, may cause limited access to be provided to the shared service (e.g., by limiting particular aspects of the shared service, by restricting network performance metrics relating to the shared service, and/or the like), and/or the like.

In this way, UE 202-1 assists authentication server 204 in authenticating the user to provide UE 202-1 with access to the shared service.

Figure 2C:
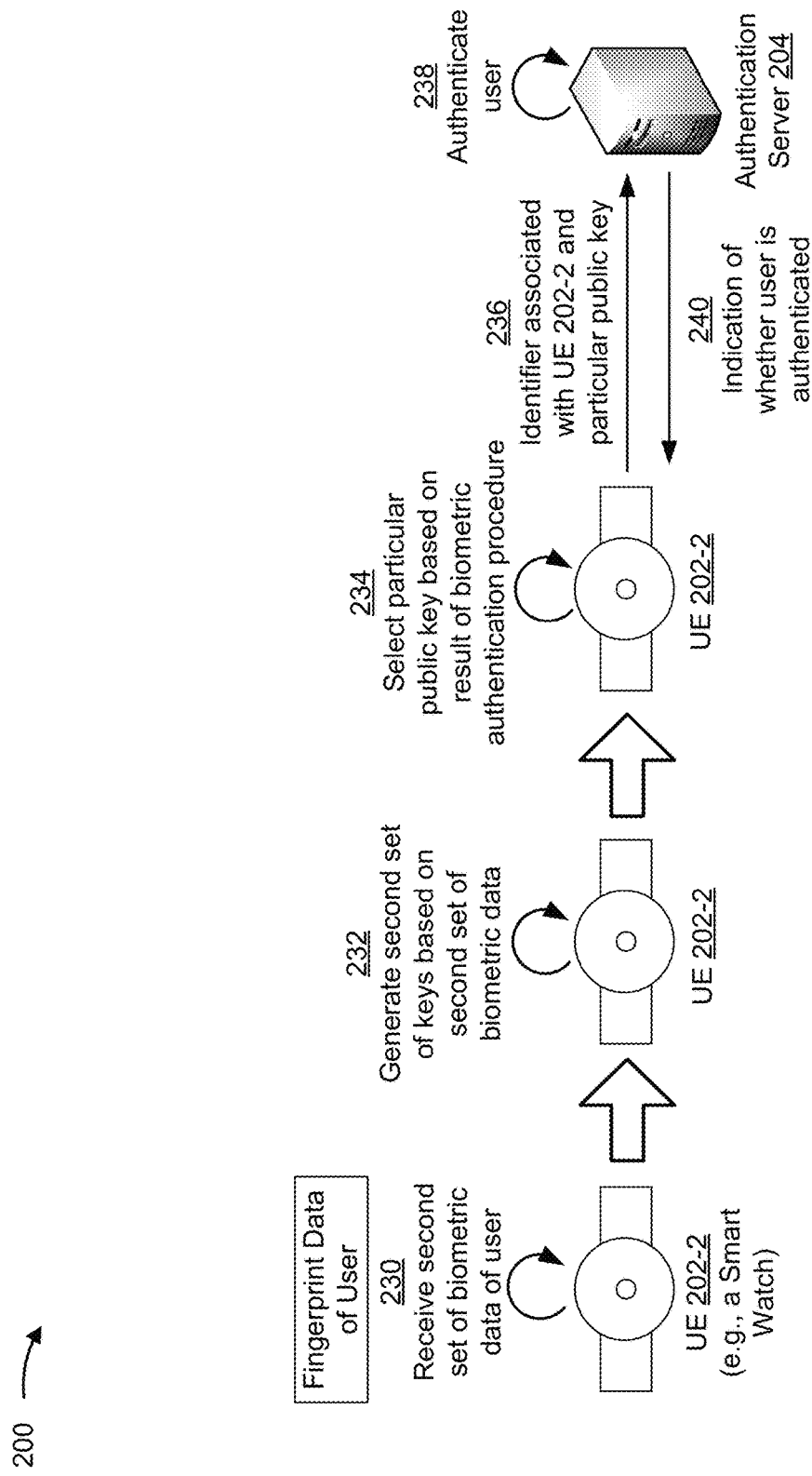

As shown in FIG. 2C, and by reference number 230, UE 202-2 may receive a second set of biometric data of the user. For example, the user may interact with an interface of UE 202-2 to cause UE 202-2 to capture a second set of biometric data. As shown by reference number 232, UE 202-2 may generate the second set of keys based on the second set of biometric data. For example, UE 202-2 (e.g., using the secure environment) may generate a second set of keys in a manner described elsewhere herein (e.g., by using one or more biometric encryption functions to process the second set of biometric data). The second set of keys may include at least a second private key and a second public key (e.g., in some cases, the second set of keys may include multiple public keys).

As shown by reference number 234, UE 202-2 may select a particular public key based on a result of the biometric authentication procedure. For example, UE 202-2 may select the configured public key, or the second public key, based on a result of the key authentication procedure. To perform the key authentication procedure, UE 202-2 (e.g., using the secure environment) may reference the data structure associated with the secure environment to compare the second set of keys with the configured set of keys (or to compare the configured public key and the second public key).

If the configured set of keys match the second set of keys (or if the configured public key matches the second public key), UE 202-2 may select the configured public key as the particular public key that is to be provided to authentication server 204. If the configured set of keys do not match the second set of keys (or if the configured public key does not match the second public key), UE 202-2 may select the second public key as the particular public key that is to be provided to authentication server 104. In the example shown, UE 202-2 may select the configured public key based on the configured public key matching the second public key.

As shown by reference number 236, UE 202-2 may provide, to authentication server 204, the identifier associated with UE 202-2 and the particular public key. As shown by reference number 238, authentication server 204 may authenticate the user. For example, authentication server 204 may perform the authentication procedure to authenticate the user. The authentication procedure may include verifying whether the identifier received is associated with a UE that is registered for the biometric authentication service, verifying whether the particular public key matches the configured public key stored via the data structure associated with the account of the user, and/or the like.

As shown by reference number 240, authentication server 204 may provide, to UE 202-2, an indication of whether the user has been authenticated. In some implementations, if the authentication procedure was successful, authentication server 204 may cause full access of the shared service to be provided to UE 202-2. In some implementations, if the authentication procedure did not succeed, authentication server 204 may prevent UE 202-2 from accessing the shared service, may cause limited access to be provided to the shared service (e.g., by limiting particular aspects of the shared service, by restricting network performance metrics relating to the shared service, and/or the like), and/or the like.

In this way, UE 202-2 assists authentication server 204 in authenticating the user to provide UE 202-2 with access to the shared service. Furthermore, it is to be noted that UE 202-2 may be used to authenticate the user without needing a SIM card of UE 202-1, without needing a secure element, and/or the like.

Figure 2D:
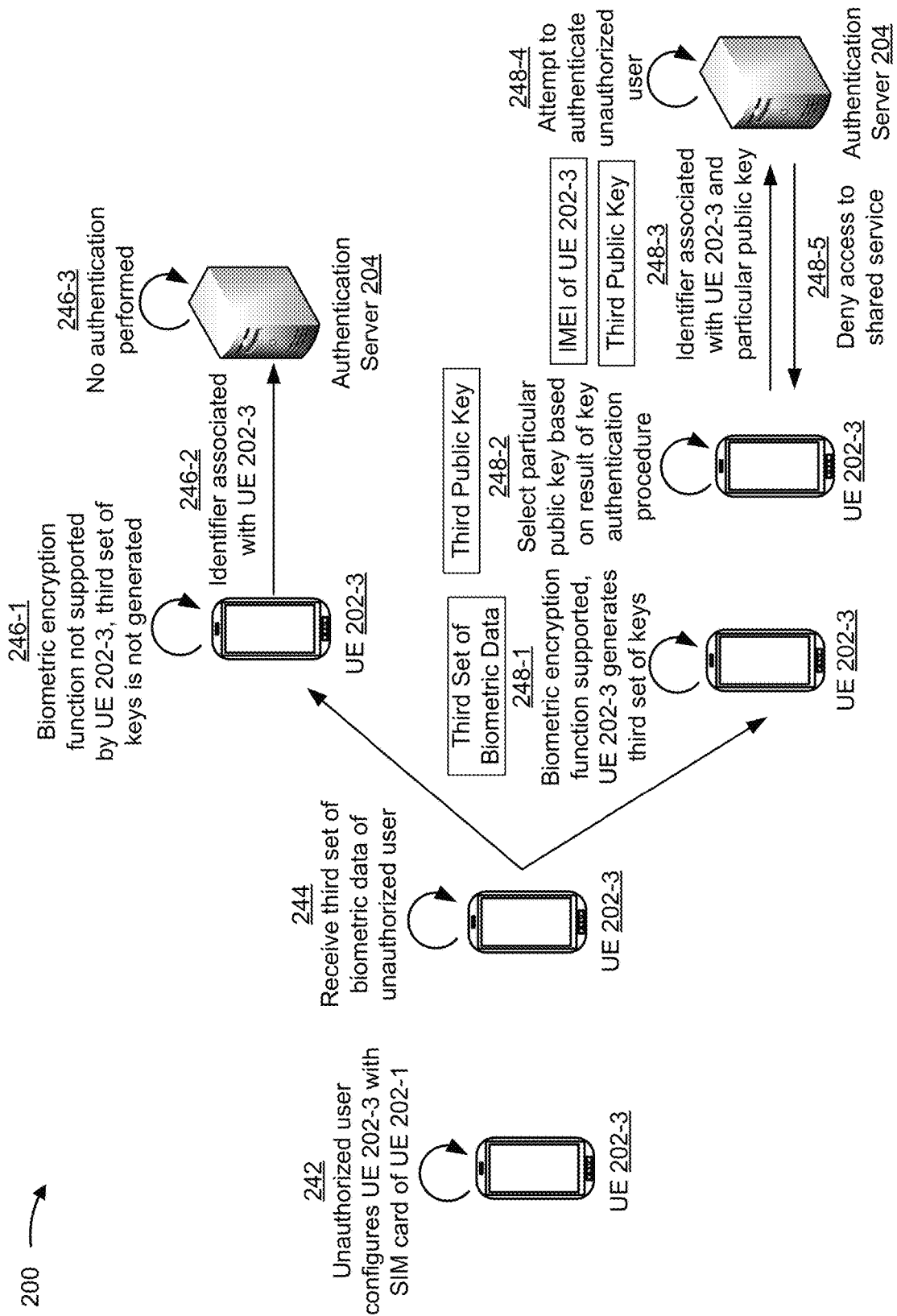

As shown in FIG. 2D, an unauthorized user may be denied access to the shared service. For example, and as shown by reference number 242, the unauthorized user may configure UE 202-3 with the SIM card of UE 202-1. As shown by reference number 244, UE 202-3 may receive a third set of biometric data of the unauthorized user. As shown by reference number 246-1, UE 202-3 may not support a biometric encryption function, which may prevent UE 202-3 from generating a third set of keys. For example, if UE 202-3 is not configured with a secure environment that includes a biometric encryption function, then UE 202-3 will not generate a third set of keys. Consequently, and as shown by reference number 246-2, UE 202-3 may provide authentication server 204 with the identifier associated with UE 202-3 (but not with a third public key). As shown by reference number 246-3, authentication server 204 may not perform the authentication procedure, which may prevent UE 202-3 from being granted access to the shared service.

As shown by reference number 248-1, the biometric encryption function may be supported, which may allow UE 202-3 to generate the third set of keys. In this case, UE 202-3 may generate the third set of keys based on the third set of biometric data (e.g., of the unauthorized user). As shown by reference number 248-2, UE 202-3 may select a particular public key based on a result of the key authentication procedure. For example, UE 202-3 may perform the key authentication procedure by comparing the configured public key and the third public key. In the example shown, because the configured public key does not match the third public key, UE 202-3 may select the third public key to be provided to authentication server 204.

As shown by reference number 248-3, UE 202-3 may provide, to authentication server 204, an identifier associated with UE 202-3 and the particular public key (e.g., shown as an IMEI number of UE 202-3 and the third public key). As shown by reference number 248-4, authentication server 204 may attempt to authenticate the unauthorized user. In this case, authentication server 204 may reference the data structure associated with the account of the user to compare the particular public key received from UE 202-2 and the configured public key that is stored via the data structure associated with the account of the user. In the example shown, the authentication procedure will not succeed because authentication server 204 may determine that the particular public key received from UE 202-2 does not match the configured public key. As shown by reference number 248-5, authentication server 204 may provide, to UE 202-3, an indication that access to the shared service has been denied.

In this way, a particular UE that is configured with the secure environment (e.g., UE 102-1, UE 102-2, UE 102-3, and/or the like) improves security and privacy for the user, ensures that only authorized users are able to access the shared service, and/or the like.

Figure 2E:
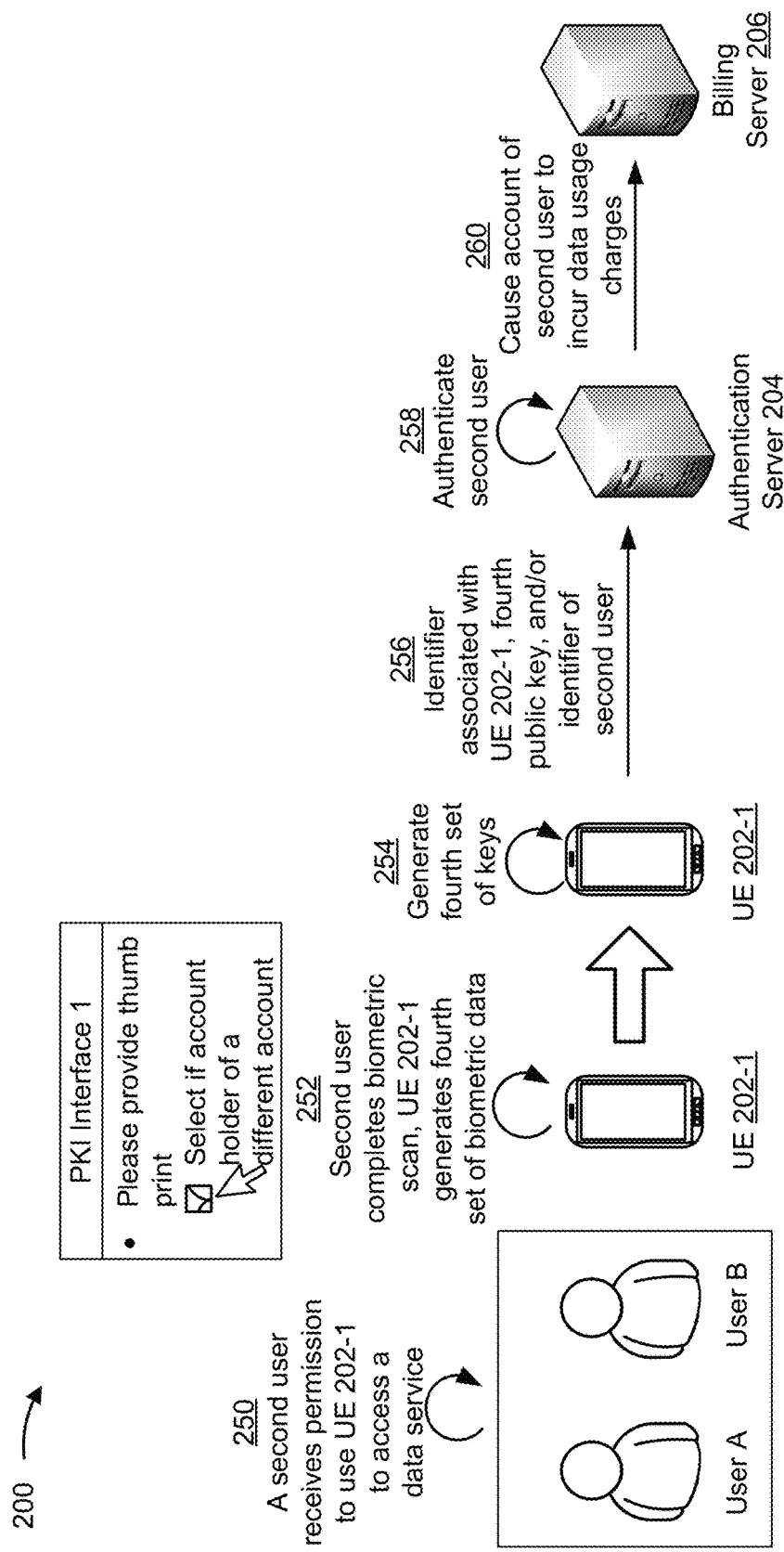

As shown in FIG. 2E, a second user may use a UE that is linked to the account of the user (e.g., UE 202-1) to access a data service, but data usage may be charged to an account of the second user. For example, and as shown by reference number 250, the second user may receive permission to use UE 202-1 to access the data service. As shown by reference number 252, the second user may interact with an interface of UE 202-1 to complete a biometric scan. In some implementations, the interface may display a set of instructions for the second user that may be followed to complete the biometric scan. In some cases, as shown, the interface may allow the second user to indicate that the second user is an account holder of a different account. Additionally, or alternatively, the interface may allow the user to input identifying information, such as a name, a telephone number, and/or the like. In one or more of these cases, UE 202-1 (e.g., using the secure environment) may generate a fourth set of biometric data that corresponds to the second user.

As shown by reference number 254, UE 202-1 may generate a fourth set of keys based on the fourth set of biometric data. As shown by reference number 256, UE 202-1 may provide, to authentication server 204, the identifier associated with UE 202-1, a fourth public key of the fourth set of keys, and/or an identifier of the second user. The identifier of the second user may be a name of the second user, a phone number of the second user, the fourth set of biometric data of the second user, and/or the like. The identifier of the second user may be provided based on the second user indicating that the second user is not an authorized user of the account that is linked to UE 202-1 (but is an account holder of a different account).

As shown by reference number 258, authentication server 204 may authenticate the second user. For example, authentication server 204 may use the identifier of the second user to locate the account of the second user. The user profile data for the account may, similar to the user, associate identifiers of one or more UEs that are linked to the account of the second user and a particular configured public key that was generated when the second user registered for the biometric authentication service. In this case, authentication server 204 may compare the fourth public key and the particular configured public key to determine whether to authenticate the second user.

As shown by reference number 260, authentication server 204 may cause the account of the second user to incur data usage charges for data usage on UE 202-1. For example, authentication server 204 may interact with billing server 206 to cause the account of the second user to incur data usage charges for the data usage on UE 202-1. This may allow the second user to access a data service on UE 202-1, without the account of the user being charged for the data usage performed by the second user.

In this way, the second user can use UE 202-1 to access a data service and the account of the second user may incur any charges for data usage corresponding to the data service.

Figure 3:
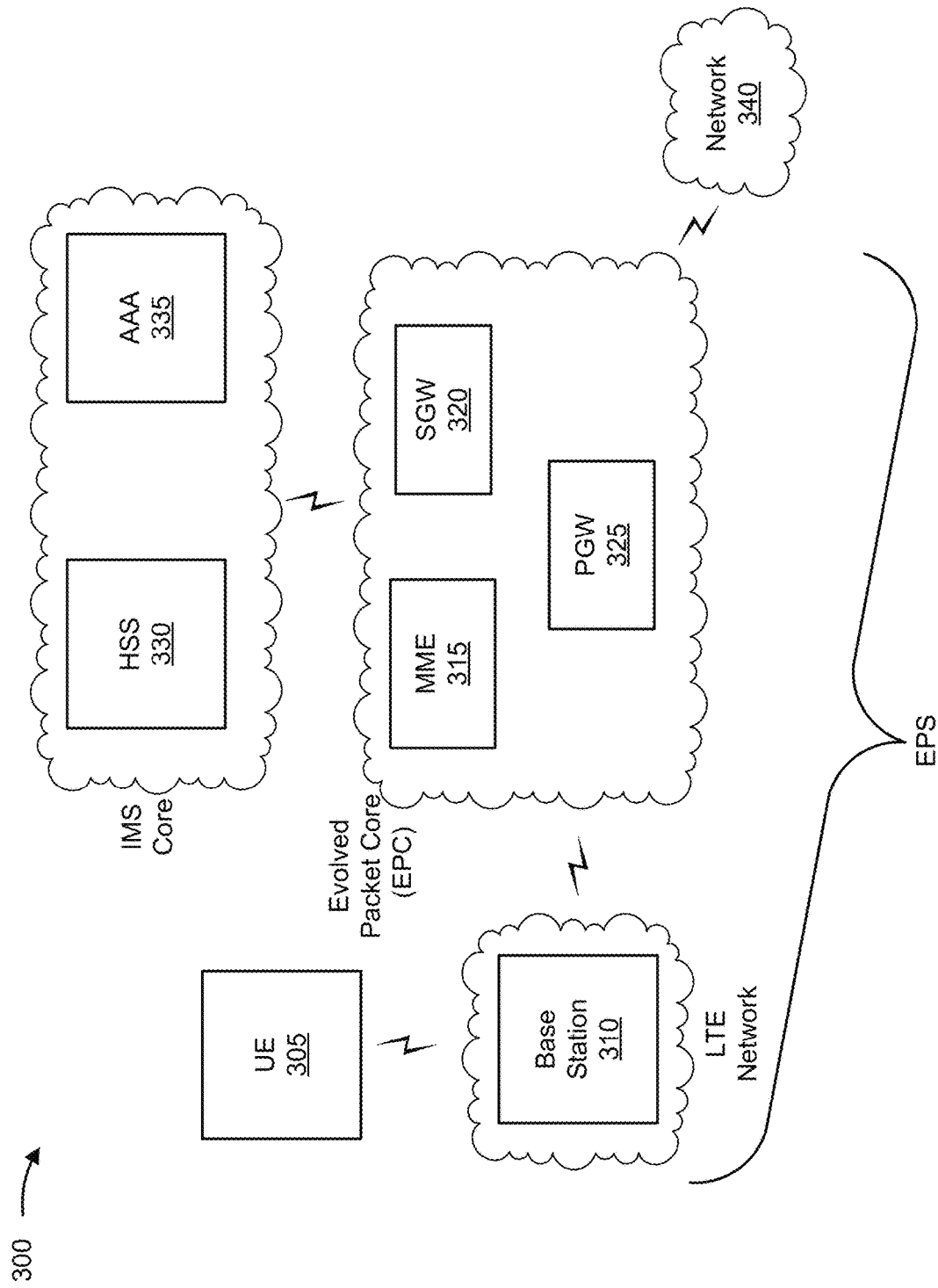
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a user equipment (UE) 305, a base station 310, a mobility management entity (MME) 315, a serving gateway (SGW) 320, a packet data network (PDN) gateway (PGW) 325, a home subscriber server (HSS) 330, an authentication, authorization, and accounting (AAA) server 335, and/or a network 340. Devices of environment 300 may interconnect via wired connections, wireless connections, or a combination of wired and wireless connections.

Some implementations are described herein as being performed within a long term evolution (LTE) network for explanatory purposes. Some implementations may be performed within a network that is not an LTE network, such as a third generation (3G) network, a fifth generation (5G) network, and/or the like.

Environment 300 may include an evolved packet system (EPS) that includes an LTE network and/or an evolved packet core (EPC). The LTE network may include a radio access network (RAN) that includes one or more base stations 310 that take the form of evolved Node Bs (eNBs) via which UE 305 communicates with the EPC. The EPC may include MME 315, SGW 320, and/or PGW 325 that enable UE 305 to communicate with network 340 and/or an Internet protocol (IP) multimedia subsystem (IMS) core. The IMS core may include HSS 330 and/or AAA 335, and may manage device registration and authentication, session initiation, etc., associated with UE 305. HSS 330 and/or AAA 335 may reside in the EPC and/or the IMS core.

UE 305 includes one or more devices capable of communicating with base station 310 and/or a network (e.g., network 340). For example, UE 305 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, and/or a similar device. UE 205 may send traffic to and/or receive traffic from network 340 (e.g., via base station 310, SGW 320, and/or PGW 325).

In some implementations, UE 305 may include a secure element. The secure element may include one or more devices capable of securely hosting an operating system, an application, and/or securely storing information that may be used to authenticate the user. For example, the secure element may include a universal integrated circuit card (UICC), a secure digital (SD) card (e.g., a micro SD card, and/or the like), an embedded secure element, a tamper-resistant hardware component or element, and/or the like. In some cases, the secure element may be configured with a secure storage applet that includes one or more encryption functions and/or authentication functions that assist in secure authentication of the user. In some implementations, the secure element may be hosted by a subscriber identity module (SIM) card and/or by another type of device or element. The SIM card may be a physical SIM card, a virtual SIM card, and/or the like.

Additionally, or alternatively, UE 305 may include a secure environment. The secure environment may include a trust execution environment (TEE) and/or a similar type of environment. The secure environment may be capable of receiving biometric data from one or more sensors of UE 305, and may support one or more biometric encryption functions (e.g., one or more biometric public key infrastructure (PKI) functions, and/or the like) that may be used to generate keys based on biometric data, one or more authentication functions may be used to assist in secure authentication of the user, and/or the like. In some implementations, UE 305 may use the secure element and/or the secure environment to perform one or more actions described in connection with FIGS. 1A-1D and FIGS. 2A-2E.

Base station 310 includes one or more devices capable of transferring traffic, such as audio, video, text, and/or other traffic, destined for and/or received from UE 305. In some implementations, base station 310 may include an eNB associated with the LTE network that receives traffic from and/or sends traffic to network 340 via SGW 320 and/or PGW 325. Additionally, or alternatively, one or more base stations 310 may be associated with a RAN that is not associated with the LTE network. Base station 310 may send traffic to and/or receive traffic from UE 305 via an air interface. In some implementations, base station 310 may include a small cell base station, such as a base station of a microcell, a picocell, and/or a femtocell.

MME 315 includes one or more devices, such as one or more server devices, capable of managing authentication, activation, deactivation, and/or mobility functions associated with UE 305. In some implementations, MME 315 may perform operations relating to authentication of UE 305. Additionally, or alternatively, MME 315 may facilitate the selection of a particular SGW 320 and/or a particular PGW 325 to serve traffic to and/or from UE 305. MME 315 may perform operations associated with handing off UE 305 from a first base station 310 to a second base station 310 when UE 305 is transitioning from a first cell associated with the first base station 310 to a second cell associated with the second base station 310. Additionally, or alternatively, MME 315 may select another MME (not pictured), to which UE 305 should be handed off (e.g., when UE 305 moves out of range of MME 315).

SGW 320 includes one or more devices capable of routing packets. For example, SGW 320 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 320 may aggregate traffic received from one or more base stations 310 associated with the LTE network and may send the aggregated traffic to network 340 (e.g., via PGW 325) and/or other network devices associated with the EPC and/or the IMS core. SGW 320 may also receive traffic from network 340 and/or other network devices and may send the received traffic to UE 305 via base station 310. Additionally, or alternatively, SGW 320 may perform operations associated with handing off UE 305 to and/or from an LTE network.

PGW 325 includes one or more devices capable of providing connectivity for UE 305 to external packet data networks (e.g., other than the depicted EPC and/or LTE network). For example, PGW 325 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 325 may aggregate traffic received from one or more SGWs 320 and may send the aggregated traffic to network 340. Additionally, or alternatively, PGW 325 may receive traffic from network 340, and may send the traffic to UE 305 via SGW 320 and base station 310. PGW 325 may record data usage information (e.g., byte usage), and may provide the data usage information to AAA 335.

HSS 330 includes one or more devices, such as one or more server devices, capable of managing (e.g., receiving, generating, storing, processing, and/or providing) information associated with UE 305. For example, HSS 330 may manage subscription information associated with UE 305, such as information that identifies a subscriber profile of a user associated with UE 305, information that identifies services and/or applications that are accessible to UE 305, location information associated with UE 305, a network identifier (e.g., a network address) that identifies UE 305, information that identifies a treatment of UE 305 (e.g., quality of service information, a quantity of minutes allowed per time period, a quantity of data consumption allowed per time period, etc.), and/or similar information. HSS 330 may provide this information to one or more other devices of environment 200 to support the operations performed by those devices.

In some implementations, HSS 330 may use a data structure to associate a configured public key with one or more identifiers associated with one or more corresponding UEs 305 that are linked to an account of a user (e.g., which are eligible to receive access to a shared service). In some implementations, HSS 330 may reference the data structure to determine whether to authenticate a user. In some implementations, a unified data management (UDM) server may be implemented as part of a 5G network and may perform one or more functions and/or actions being executed and/or performed by HSS 330. In some implementations, an over the air (OTA) platform may be implemented and may perform one or more functions and/or actions being executed and/or performed by HSS 330 and/or the UDM server. Furthermore, it is to be understood that the authentication server used in connection with FIGS. 1A-1D and FIGS. 2A-2E may be HSS 330, the UDM server, the OTA platform, and/or a similar type of device or platform.

AAA 335 includes one or more devices, such as one or more server devices, that perform authentication, authorization, and/or accounting operations for communication sessions associated with UE 305. For example, AAA 335 may perform authentication operations for UE 305 and/or a user of UE 305 (e.g., using one or more credentials), may control access, by UE 305, to a service and/or an application (e.g., based on one or more restrictions, such as time-of-day restrictions, location restrictions, single or multiple access restrictions, read/write restrictions, etc.), may track resources consumed by UE 305 (e.g., a quantity of voice minutes consumed, a quantity of data consumed, etc.), and/or may perform similar operations.

Network 340 includes one or more wired and/or wireless networks. For example, network 340 may include a telecommunications network (e.g., an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 3 are provided as one or more examples. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
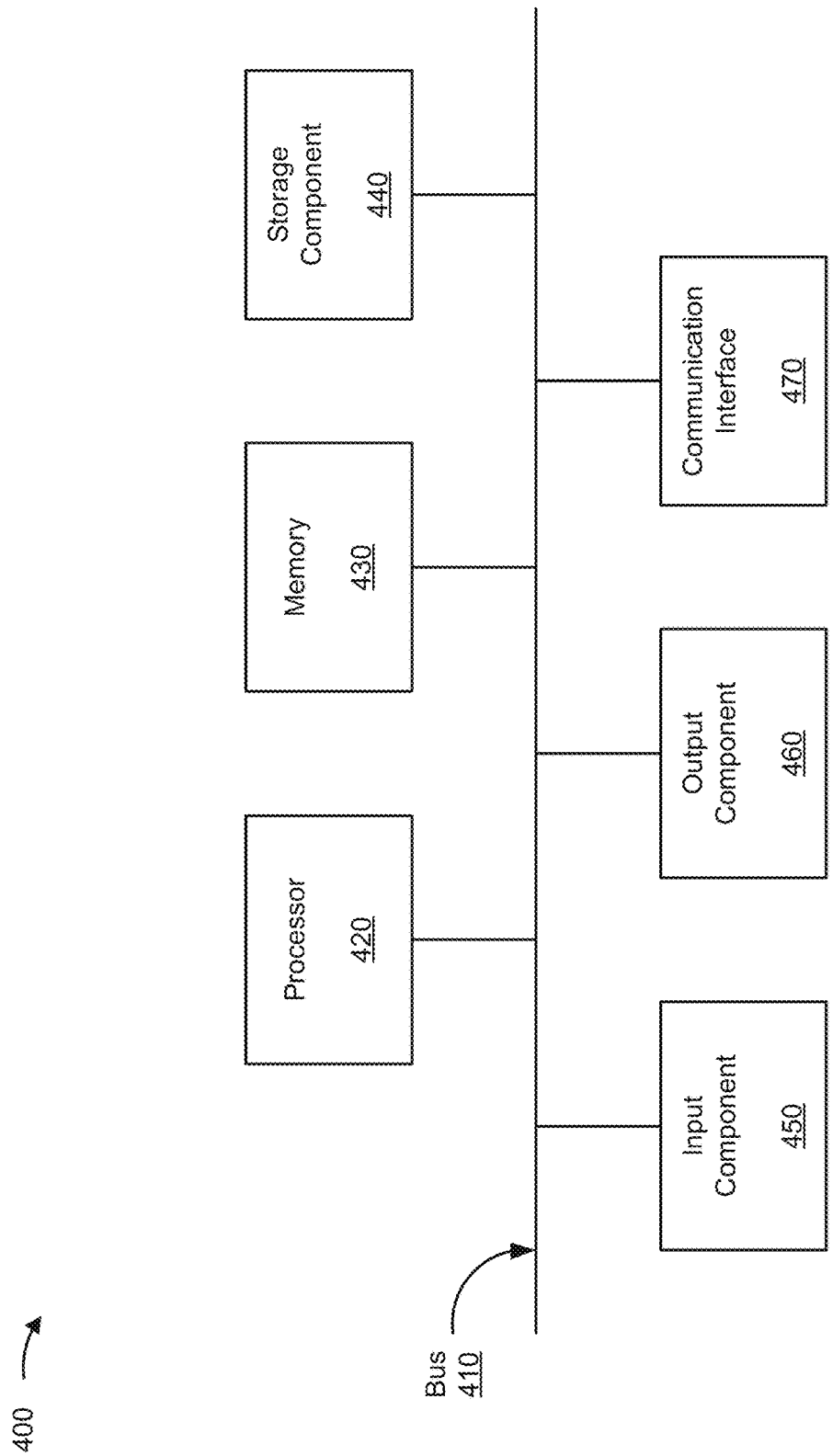
FIG. 4 is a diagram of example components of one or more devices of FIG. 3.

FIG. 4 is a diagram of example components of a device 400. Device 400 may correspond to UE 305, base station 310, MME 315, SGW 320, PGW 325, HSS 330, and/or AAA 335. In some implementations, UE 305, base station 310, MME 315, SGW 320, PGW 325, HSS 330, and/or AAA 335 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among multiple components of device 400. Processor 420 is implemented in hardware, firmware, and/or a combination of hardware and software. Processor 420 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing component. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a component for determining location (e.g., a global positioning system (GPS) component) and/or a sensor (e.g., an accelerometer, a gyroscope, an actuator, another type of positional or environmental sensor, and/or the like). Output component 460 includes a component that provides output information from device 400 (via, e.g., a display, a speaker, a haptic feedback component, an audio or visual indicator, and/or the like).

Communication interface 470 includes a transceiver-like component (e.g., a transceiver, a separate receiver, a separate transmitter, and/or the like) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a wireless local area network interface, a cellular network interface, and/or the like.

Device 400 may perform one or more processes described herein. Device 400 may perform these processes based on processor 420 executing software instructions stored by a non-transitory computer-readable medium, such as memory 430 and/or storage component 440. As used herein, the term "computer-readable medium" refers to a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
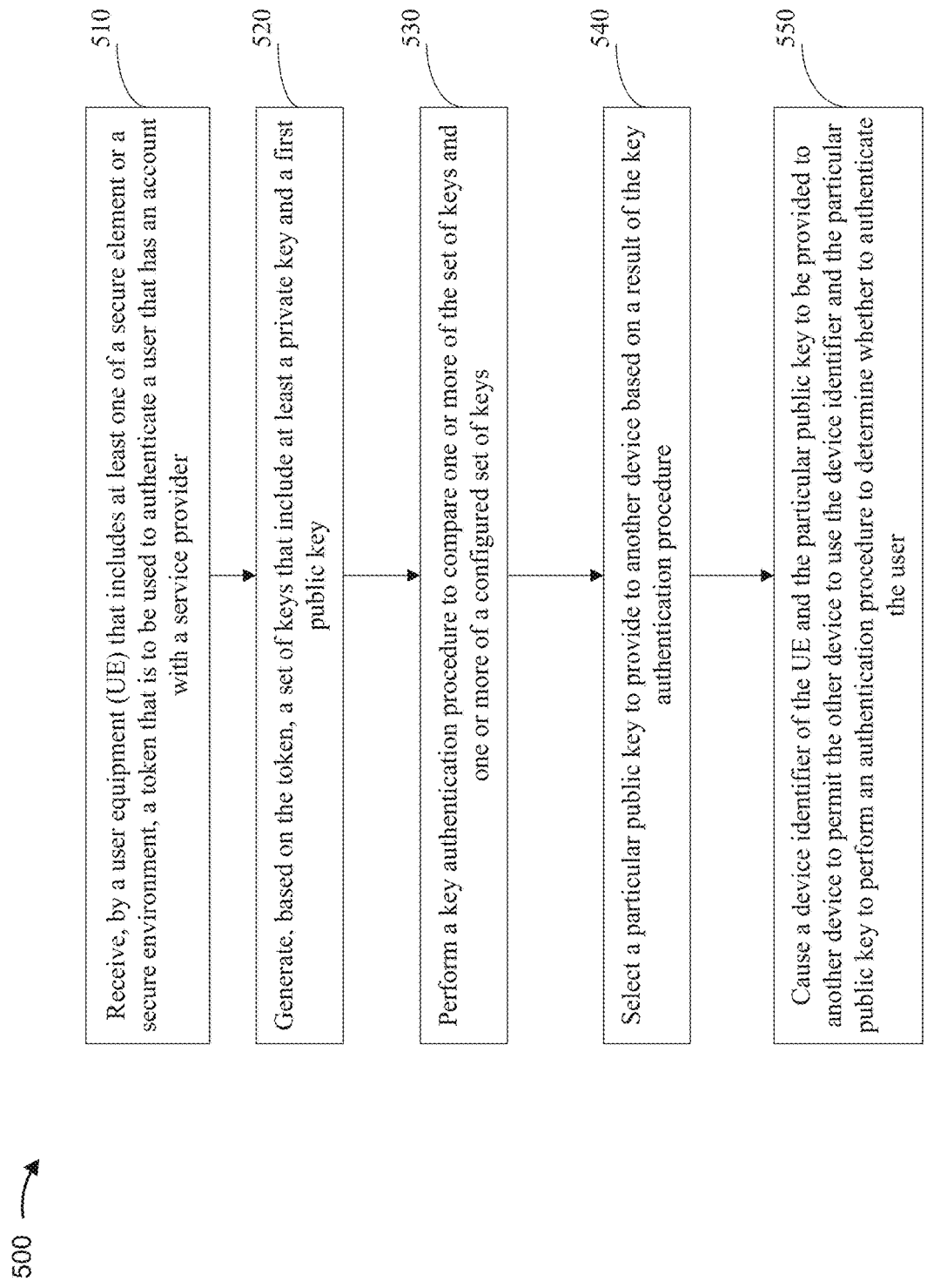
FIG. 5 is a flow chart of an example process for authenticating a user on a device that has a secure element that is linked to an account that the user has with a service provider.

FIG. 5 is a flowchart of an example process 500 for authenticating a user on a device that has a secure element that is linked to an account that the user has with a service provider. In some implementations, one or more process blocks of FIG. 5 may be performed by a user equipment (UE) (e.g., UE 305). In some implementations, one or more process blocks of FIG. 5 may be performed by another device or a group of devices separate from or including the UE, such as a base station (e.g., base station 310), a mobility management entity (MME) (e.g., MME 315), a serving gateway (SGW) (e.g., SGW 320), a packet data network (PDN) gateway (PGW) (e.g., PGW 325), a home subscriber server (HSS) (e.g., HSS 330), an authentication, authorization and accounting (AAA) server (e.g., AAA 335), and/or the like.

As shown in FIG. 5, process 500 may include receiving, by a user equipment (UE) that includes at least one of a secure element or a secure environment, a token that is to be used to authenticate a user that has an account with a service provider (block 510). For example, the UE (e.g., using processor 420, memory 430, storage component 440, input component 450, communication interface 470, and/or the like) may receive a token that is to be used to authenticate a user that has an account with a service provider, as described above. In some implementations, the UE may include at least one of: a secure element, or a secure environment.

In some implementations, the secure element may be configured in a manner that prevents successful authentication on devices that have secure elements but that are not linked to the account of the user. In some implementations, the secure element may be configured in a manner that prevents successful authentication if the received token does not match a configuration token. In some implementations, the secure element may be configured in a manner that prevents successful authentication of devices that are unable to support the secure element. In some implementations, the UE may receive the token based on an interaction that the user makes with an interface of the UE.

In some implementations, the token may include at least one of: a password of the user, a personal identification number (PIN) of the user, or biometric data of the user. In some implementations, one or more processors of the UE may receive, as the token, biometric data from one or more sensors of the UE.

As further shown in FIG. 5, process 500 may include generating, based on the token, a set of keys that include at least a private key and a first public key (block 520). For example, the UE (e.g., using processor 420, memory 430, storage component 440, and/or the like) may generate, based on the token, a set of keys that include at least a private key and a first public key, as described above.

In some implementations, the UE may generate the set of keys by processing the token using the secure element. In some implementations, the UE may generate the set of keys by processing the token using the secure environment. For example, the token may include biometric data of the user, and the UE may generate the set of keys by processing the biometric data using the secure environment of the device.

In some implementations, the UE may identify the set of keys (e.g., rather than generate the set of keys). For example, the set of keys may be pre-configured and the UE may identify the set of keys based on the received token.

As further shown in FIG. 5, process 500 may include performing a key authentication procedure to compare one or more of the set of keys and one or more of a configured set of keys that are stored in association with a device identifier (block 530). For example, the UE (e.g., using processor 420, memory 430, storage component 440, and/or the like) may perform a key authentication procedure to compare the set of keys and a configured set of keys that are stored in association with a device identifier, as described above.

In some implementations, the association may be stored via a data structure that is supported by a subscriber identity module (SIM) card associated with the UE. In some implementations, the secure element of the UE may be included as part of the SIM card. In some implementations, the SIM card may be a physical SIM card (e.g., a SIM card that is provisioned with a specific SIM profile, an eSIM card that may be remotely provisioned, and/or the like), or a virtual SIM card.

In some implementations, before performing the key authentication procedure, the UE may determine whether to perform a first action or a second action based on whether contents of a data structure include a configured set of keys. The first action may be to use the data structure to store the token in association with the set of keys. The second action may be to select the first public key, of the set of keys, or a second public key, of the configured set of keys, based on a result of the key authentication procedure. In this case, the UE may perform the first action or the second action based on whether the contents of the data structure include the configured set of keys.

As further shown in FIG. 5, process 500 may include selecting a particular public key to provide to another device based on a result of the key authentication procedure (block 540). For example, the UE (e.g., using processor 420, memory 430, storage component 440, and/or the like) may select a particular public key to provide to another device based on a result of the key authentication procedure, as described above. In some implementations, the particular public key may be the first public key of the set of keys or a second public key of the configured set of keys.

As further shown in FIG. 5, process 500 may include causing a device identifier of the UE and the particular public key to be provided to another device to permit the other device to use the UE identifier and the particular public key to perform an authentication procedure to determine whether to authenticate the user (block 550). For example, the UE (e.g., using processor 420, memory 430, storage component 440, input component 450, output component 460, communication interface 470, and/or the like) may cause a device identifier of the UE and the particular public key to be provided to another device to permit the other device to use the UE identifier and the particular public key to perform an authentication procedure to determine whether to authenticate the user, as described above. In some implementations, authenticating the user may cause the UE to be given access to a shared service. In some implementations, the UE may receive, from the other device, an indication of whether the UE has been given access to the shared service.

In some implementations, the token may be a first token. In some implementations, the UE may be part of a set of UEs that are linked to the account of the user and that are capable of supporting the secure element. In some implementations, the authentication procedure may be capable of being performed on at least one of the set of UEs using the secure element and a second token that corresponds to the first token.

In some implementations, the token may include biometric data of the user and the UE may generate the set of keys based on the biometric data. In some implementations, the account that the user has with the service provider may not be linked to the UE. In this case, the authentication procedure performed by the other device may authenticate the user that has the account based on the particular public key that has been generated from the biometric data. In this case, performing the authentication procedure may cause one or more services to be made available to the UE in a manner that charges the account of the user and not another account (e.g., of another user) that is linked to the UE.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   generating, by a first device and based on processing a token that is used to authenticate a user with a service provider, a first set of keys,
       wherein the first set of keys includes a first public key, and
       wherein the token is processed by using at least one of a secure element of the first device or a secure environment of the first device;
   comparing, by the first device, the first public key with a second public key of a second set of keys that are stored in association with the first device to determine whether the first public key matches the second public key;
   selecting, by the first device and based on determining whether the first public key matches the second public key, a particular key, from the first public key and the second public key, to provide to a second device,
       wherein, when the first public key does match the second public key, the particular key is the first public key, and
       wherein, when the first public key does not match the second public key, the particular key is the second public key; and
   causing, by the first device, a device identifier associated with the first device and the particular key to be provided to the second device for authenticating the user.

2. The method of claim 1, further comprising:
   generating, by the first device and based on a configuration token that is used to authenticate access attempts, the second set of keys.

3. The method of claim 1, wherein the secure element causes the authentication of the user when the secure element is linked to an account associated with the user.

4. The method of claim 1, wherein authenticating the user is based on the particular key being generated from biometric data of the user.

5. The method of claim 1, wherein the token is a first token, and
   wherein the secure element causes authentication of the user when the first token matches a second token that is used to generate the second set of keys.

6. The method of claim 1, wherein the token includes at least one of:
   biometric data of the user,
   a personal identification number (PIN), or
   a value that represents a password.

7. The method of claim 1, wherein the secure element or the secure environment has access to a data structure that associates the second set of keys with a configuration token that is used to generate the second set of keys.

8. A first device, comprising:
one or more processors configured to:
generate, based on processing a token that is used to authenticate a user with a service provider, a first set of keys,
wherein the first set of keys includes a first public key, and
wherein the token is processed by using at least one of a secure element of the first device or a secure environment of the first device;
compare the first public key with a second public key of a second set of keys that are stored in association with the first device to determine whether the first public key matches the second public key;
select, based on determining whether the first public key matches the second public key, a particular key, from the first public key and the second public key, to provide to a second device,
wherein, when the first public key does match the second public key, the particular key is the first public key, and
wherein, when the first public key does not match the second public key, the particular key is the second public key; and
cause a device identifier associated with the first device and the particular key to be provided to the second device for authenticating the user.

9. The first device of claim 8, wherein the one or more processors are further configured to:
generate, based on a configuration token that is used to authenticate access attempts, the second set of keys.

10. The first device of claim 8, wherein the secure element causes the authentication of the user when the secure element is linked to an account associated with the user.

11. The first device of claim 8, wherein authenticating the user is based on the particular key being generated from biometric data of the user.

12. The first device of claim 8, wherein the token is a first token, and
wherein the secure element causes authentication of the user when the first token matches a second token that is used to generate the second set of keys.

13. The first device of claim 8, wherein the token includes at least one of:
biometric data of the user,
a personal identification number (PIN), or
a value that represents a password.

14. The first device of claim 8, wherein the secure element or the secure environment has access to a data structure that associates the second set of keys with a configuration token that is used to generate the second set of keys.

15. A non-transitory computer-readable medium storing a set of instructions, the set of instructions comprising:
one or more instructions that, when executed by one or more processors of a first device, cause the first device to:
generate, based on processing a token that is used to authenticate a user with a service provider, a first set of keys,
wherein the first set of keys includes a first public key, and
wherein the token is processed by using at least one of a secure element of the first device or a secure environment of the first device;
compare the first public key with a second public key of a second set of keys that are stored in association with the first device to determine whether the first public key matches the second public key;
select, based on determining whether the first public key matches the second public key, a particular key, from the first public key and the second public key, to provide to a second device,
wherein, when the first public key does match the second public key, the particular key is the first public key, and
wherein, when the first public key does not match the second public key, the particular key is the second public key; and
cause a device identifier associated with the first device and the particular key to be provided to the second device for authenticating the user.

16. The non-transitory computer-readable medium of claim 15, wherein the one or more instructions further cause the first device to:
generate, based on a configuration token that is used to authenticate access attempts, the second set of keys.

17. The non-transitory computer-readable medium of claim 15, wherein the secure element causes the authentication of the user when the secure element is linked to an account associated with the user.

18. The non-transitory computer-readable medium of claim 15, wherein authenticating the user is based on the particular key being generated from biometric data of the user.

19. The non-transitory computer-readable medium of claim 15, wherein the token is a first token, and
wherein the secure element causes authentication of the user when the first token matches a second token that is used to generate the second set of keys.

20. The non-transitory computer-readable medium of claim 15, wherein the secure element or the secure environment has access to a data structure that associates the second set of keys with a configuration token that is used to generate the second set of keys.

* * * * *